United States Patent
Yoshihara et al.

(10) Patent No.: US 12,497,527 B2
(45) Date of Patent: Dec. 16, 2025

(54) INK, IMAGE FORMING APPARATUS, AND IMAGE FORMING METHOD

(71) Applicants: Mayumi Yoshihara, Kanagawa (JP); Michihiko Namba, Kanagawa (JP); Takashi Tamai, Kanagawa (JP); Shin Hasegawa, Tokyo (JP); Yuta Nakamura, Kanagawa (JP); Daiki Hasebe, Tokyo (JP)

(72) Inventors: Mayumi Yoshihara, Kanagawa (JP); Michihiko Namba, Kanagawa (JP); Takashi Tamai, Kanagawa (JP); Shin Hasegawa, Tokyo (JP); Yuta Nakamura, Kanagawa (JP); Daiki Hasebe, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 161 days.

(21) Appl. No.: 18/472,679

(22) Filed: Sep. 22, 2023

(65) Prior Publication Data

US 2024/0117206 A1    Apr. 11, 2024

(30) Foreign Application Priority Data

Sep. 26, 2022 (JP) ................. 2022-152704
Jul. 13, 2023 (JP) ................. 2023-115079

(51) Int. Cl.
*C09D 11/322* (2014.01)

(52) U.S. Cl.
CPC ................. *C09D 11/322* (2013.01)

(58) Field of Classification Search
CPC ..... B41J 2/14016; B41M 7/009; C09D 11/40; C09D 11/322; C09D 11/107; C09D 11/38; C09D 11/102
See application file for complete search history.

(56) References Cited

U.S. PATENT DOCUMENTS

| | | |
|---|---|---|
| 2006/0209149 A1 | 9/2006 | Hasegawa et al. |
| 2007/0221078 A1 | 9/2007 | Namba et al. |
| 2009/0258196 A1 | 10/2009 | Nagashima et al. |
| 2009/0263632 A1 | 10/2009 | Kojima et al. |
| 2010/0227067 A1 | 9/2010 | Namba et al. |
| 2010/0245416 A1 | 9/2010 | Ohshima et al. |

(Continued)

FOREIGN PATENT DOCUMENTS

| | | | |
|---|---|---|---|
| EP | 2266812 A2 * | 12/2010 | ........ B41M 7/0081 |
| JP | S61-059911 A | 3/1986 | |

(Continued)

OTHER PUBLICATIONS

Kondo, "Image Forming Method Using Actinic Energy Radiation Curable Ink-jet Ink And Printed Matter Obtained Thereby" (EP 2266812), Dec. 2, 20109, [Abstract, Surface Free Energy, Inkjet Image Method]. (Year: 2010).*

*Primary Examiner* — Lisa Solomon
(74) *Attorney, Agent, or Firm* — Grüneberg and Myers PLLC

(57) ABSTRACT

An ink contains water, a coloring material, a resin, and an organic solvent, wherein the dried layer of the ink has a surface free energy $\gamma_s$ having a polar component $\gamma_s^p$ of from 3.5 to 20 J/m² at 25 degrees C.

8 Claims, 4 Drawing Sheets

(56) References Cited

U.S. PATENT DOCUMENTS

| | | |
|---|---|---|
| 2010/0277548 A1 | 11/2010 | Hakiri et al. |
| 2010/0279035 A1 | 11/2010 | Namba et al. |
| 2010/0302306 A1 | 12/2010 | Hasegawa et al. |
| 2010/0302326 A1 | 12/2010 | Morohoshi et al. |
| 2010/0309260 A1 | 12/2010 | Hakiri et al. |
| 2011/0071250 A1 | 3/2011 | Naruse et al. |
| 2011/0074865 A1 | 3/2011 | Hasegawa et al. |
| 2011/0216123 A1 | 9/2011 | Tamai et al. |
| 2011/0267398 A1 | 11/2011 | Hakiri et al. |
| 2011/0300353 A1 | 12/2011 | Habashi et al. |
| 2011/0310166 A1 | 12/2011 | Namba et al. |
| 2012/0026237 A1 | 2/2012 | Hakiri et al. |
| 2012/0062646 A1 | 3/2012 | Hasegawa et al. |
| 2012/0154492 A1 | 6/2012 | Hakiri et al. |
| 2012/0207984 A1 | 8/2012 | Hasegawa et al. |
| 2012/0236066 A1 | 9/2012 | Tamai et al. |
| 2012/0242741 A1 | 9/2012 | Hasegawa et al. |
| 2013/0038660 A1 | 2/2013 | Hasegawa et al. |
| 2013/0113860 A1 | 5/2013 | Gotou et al. |
| 2014/0036010 A1 | 2/2014 | Shin et al. |
| 2014/0192112 A1 | 7/2014 | Nagashima et al. |
| 2014/0192121 A1 | 7/2014 | Bannai et al. |
| 2015/0174920 A1 | 6/2015 | Namba et al. |
| 2015/0283828 A1 | 10/2015 | Aoai et al. |
| 2015/0307729 A1 | 10/2015 | Gotou et al. |
| 2015/0367667 A1 | 12/2015 | Aoai et al. |
| 2016/0264807 A1 | 9/2016 | Sagara et al. |
| 2018/0001669 A1 | 1/2018 | Furukawa et al. |
| 2018/0126728 A1 | 5/2018 | Saito et al. |
| 2018/0127610 A1 | 5/2018 | Kido et al. |
| 2018/0336443 A1 | 11/2018 | Kaiba et al. |
| 2019/0118557 A1 | 4/2019 | Harada et al. |
| 2019/0283479 A1 | 9/2019 | Tamai et al. |
| 2019/0284412 A1 | 9/2019 | Maekawa et al. |
| 2019/0345356 A1 | 11/2019 | Kido et al. |
| 2020/0102467 A1 | 4/2020 | Nakamura et al. |
| 2020/0156389 A1 | 5/2020 | Kojima et al. |
| 2020/0238731 A1 | 7/2020 | Saito et al. |
| 2020/0299531 A1 | 9/2020 | Nakamura et al. |
| 2020/0399495 A1 | 12/2020 | Jang et al. |
| 2021/0062026 A1 | 3/2021 | Shimura et al. |
| 2021/0155012 A1 | 5/2021 | Gotou et al. |
| 2021/0238432 A1* | 8/2021 | Yoshikawa .......... B41M 5/0023 |
| 2022/0010159 A1 | 1/2022 | Ishijima et al. |
| 2022/0363063 A1 | 11/2022 | Masuda et al. |
| 2023/0183501 A1 | 6/2023 | Hasegawa et al. |

FOREIGN PATENT DOCUMENTS

| | | |
|---|---|---|
| JP | H02-051734 | 2/1990 |
| JP | H06-071882 A | 3/1994 |
| JP | H11-216946 A | 8/1999 |
| JP | 2011-025684 A | 2/2011 |
| JP | 2014-196378 A | 10/2014 |
| JP | 2018-192405 A | 12/2018 |
| JP | 2021-046515 A | 3/2021 |
| JP | 2021-066788 A | 4/2021 |
| JP | 2022-048513 A | 3/2022 |

* cited by examiner

L: LIQUID
S: SOLID
$\gamma_S$: SURFACE FREE ENERGY OF SOLID
$\gamma_L$: SURFACE FREE ENERGY OF LIQUID
$\gamma_{SL}$: INTERFACE FREE ENERGY OF SOLID AND LIQUID

INK, IMAGE FORMING APPARATUS, AND IMAGE FORMING METHOD

CROSS-REFERENCE TO RELATED APPLICATIONS

This patent application is based on and claims priority pursuant to 35 U.S.C. § 119 to Japanese Patent Application Nos. 2022-152704 and 2023-115079, filed on Sep. 26, 2022 and Jul. 13, 2023, respectively, in the Japan Patent Office, the entire disclosures of which are hereby incorporated by reference herein.

BACKGROUND

Technical Field

The present invention relates to an ink, an image forming apparatus, and an image forming method.

Description of the Related Art

Printed design film for notifying events with text and images has been attached as advertisement and design to the wall surfaces of architectures and buildings, road signs, and the surfaces of vehicles such as buses, taxies, trucks and train cars.

The film should be attached even on sites with irregularities without forming a wrinkle, which requires artisan's techniques and a number of man-hours, resulting in high costs.

Image information now can be printed by inkjet printing directly on targets including surfaces with various irregularities and curved planes as well as printing paper. Inkjet printing is so appealing that an autobody printer has been proposed that can directly spray a paint from the nozzle head perpendicularly to the body of a vehicle.

SUMMARY

According to embodiments of the present disclosure, an ink is provided that contains water, a coloring material, a resin, and an organic solvent, wherein the dried layer of the ink has a surface free energy $\gamma_s$ having a polar component $\gamma_s^p$ of from 3.5 to 20 J/m² at 25 degrees C.

As another aspect of embodiments of the present disclosure, an image forming apparatus is provided that includes an accommodating unit to contain the ink mentioned above and an application device to apply the ink substantially perpendicularly to the printing surface of a printing medium.

As another aspect of embodiments of the present disclosure, an image forming method is provided which includes applying the ink mentioned above substantially perpendicularly to the printing surface of a printing medium.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
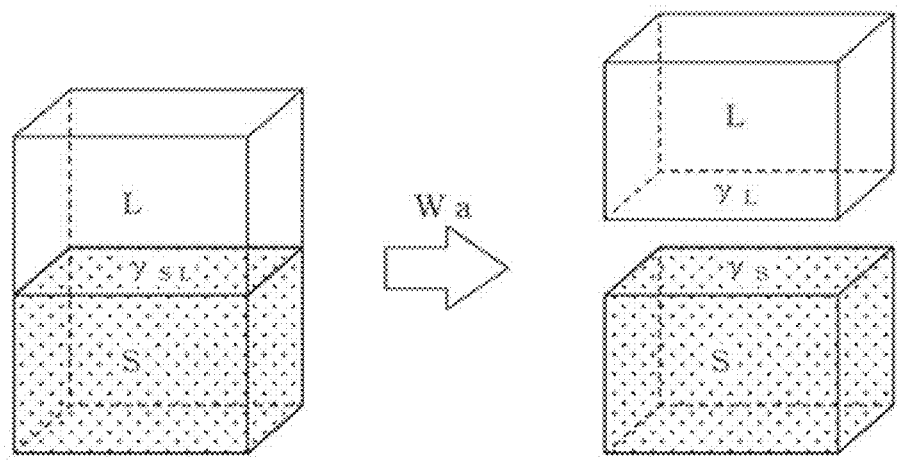
FIG. 1 is a diagram illustrating an adhesion work Wa of liquid to an ink layer.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to the present disclosure, an ink is provided that has high discharging stability and storage stability and produces a dried layer of the ink with high water-resistance, abrasion resistance, and blocking resistance.

Ink

The ink of the present disclosure contains water, a coloring material, a resin, and an organic solvent, preferably containing a surfactant, and other optional components.

The dried layer of the ink has a surface free energy having a polar component $\gamma_s^p$ of from 3.5 to 20 mJ/m² at 25 degrees C.

The ink is preferably used for inkjet printing and spray coating.

The ink of the present disclosure is made based on the issues about typical technologies described below.

Inks for inkjet involve many properties such as dischargeability, decapping time, drying time, and storage life. Inks for inkjet include an aqueous ink for inkjet, which is difficult to produce because it has several downsides. One of them is that the binder resin, a component in the ink, is not compatible with a water-soluble vehicle component and another is that the coloring material in an ink is not likely to be uniformly dispersed, causing aggregation. Such an ink has low dispersion stability and storage stability so that the ink is not stably discharged.

The inkjet ink has been required to contain a low content of volatile organic compound (VOC) according to the strict environment guideline to maintain the global environment. This requirement is expected to promote the trend of replacing solution inks with aqueous inks.

The coloring material for inkjet ink is now changing from dyes to pigments to enhance water-resistance and weatherability. In this trend, the solid layer of the ink should maintain water-resistance, shock-resistance, and attachability over a long period of time not to degrade vividness and clearness of the pictorial patterns printed on the wall surfaces of architectures and buildings, road signs, and the bodies of vehicles.

The ink of the present disclosure is formulated in consideration of this state of the current technologies. This ink has high dispersion stability and storage stability so that it has high dispersion stability and storage stability. In addition, the solid layer of this ink has high water resistance, abrasion resistance, and blocking resistance, free of scratching during car washing.

The inventors of the present invention have acquired the knowledge that the solid layer of the ink has water resistance correlated with the polar component of surface free energy. In addition, by controlling the ratio of the polar component to the surface free energy of the ink layer, a water-repellent layer can be formed. Moreover, the ink containing a particular organic solvent strikes a balance between drying property and storage stability while keeping discharging stability. The ink layer has excellent water resistance, abrasion resistance, and blocking resistance. It also has good finish and appearance.

Surface Free Energy $\gamma_s$, Polar Component $\gamma_s^p$, and Dispersive Component $\gamma_s^d$ The dried layer of the ink has a surface free energy having a polar component $\gamma_s^p$ of from 3.5 to 20 mJ/m$^2$ and preferably from 5 to 20 mJ/m$^2$ at 25 degrees C.

The surface free energy having a polar component $\gamma_s^p$ of from 3.5 to 20 mJ/m$^2$ at 25 degrees C. can be adjusted by any suitably selected method. A combinational use with the water-soluble organic solvent represented by Chemical Formula 1 and a surfactant is preferable to prepare an ink that satisfies this condition.

The ratio of the polar component $\gamma_s^p$ to the surface free energy $\gamma_s$ of the ink layer is preferably from 10 to 50 percent and more preferably from 10 to 40 percent.

Hydrophobicity or repellency of the surface of an ink layer has been discussed in many literature documents based on the values of static, dynamic, or both surface tensions in the liquid state of ink and the surface free energy $\gamma_s$ of an ink layer as indices. However, the inventors of the present invention have found that just controlling these values may not lead to enhanced water-resistance of an ink layer.

The inventors of the present invention thus made an investigation and formulated the present invention of an aqueous ink composition based on a new design concept that can significantly enhance water-resistance of an ink layer by introducing the concept of attachment.

To obtain the surface of a hydrophobic or water-repellent ink layer, the ink must completely cover and wet the surface of a substrate and adhere to the substrate.

The inventors of the present invention have reviewed the work of adhesion Wa, which means how much energy is needed to attach ink to, or conversely detach from, a substrate as an index.

The work of adhesion Wa is described with reference to FIG. 1.

The surface of liquid and surface of solid appear at detachment of a liquid pillar and a solid pillar. Both surfaces each have surface free energy so that the energy at the system after detachment is the sum of the surface free energy $\gamma_L$ of liquid and the surface free energy $\gamma_s$ of solid. The energy present in the system before detachment is the interface free energy $\gamma_{SL}$. The work of adhesion Wa is the value obtained by subtracting the interface free energy $\gamma_{SL}$ from the sum of the surface free energy $\gamma_L$ and the surface free energy $\gamma_S$. This is shown in the following equation 1 of Dupre equation.

The work of adhesion Wa is treated as "wet energy" in a system of the surface of solid and liquid droplet.

$$Wa = \gamma_S + \gamma_L - \gamma_{SL} \qquad \text{Equation 1}$$

In the equation 1 for evaluating the work of adhesion Wa corresponding to the wet energy between a dried layer of the ink and water, $\gamma_S$ is the surface free energy of an ink layer, $\gamma_L$ is the surface free energy of water, and $\gamma_{SL}$ is the interface free energy between the ink layer and water at the contact between the ink layer and water.

The surface free energy $\gamma_L$ of liquid is equal to the static surface tension of the liquid. It can be measured with an automatic surface tensiometer. However, the method of measuring the interface free energy $\gamma_{SL}$ of the interface between solid and liquid remains to be established.

For a material of solid with liquid, the following equation 2, Young's equation, is satisfied when the liquid droplet reaches equilibrium keeping a contact angle $\theta$ on the surface of the solid.

$$\gamma_S = \gamma_{SL} + \gamma_L \cos \theta \qquad \text{Equation 2}$$

Dupre equation 1 combined with Young's equation 2 forms the following Young-Dupre equation 3 of the static surface tension of a liquid and the contact angle $\theta$ at which the liquid droplet reaches equilibrium on the surface of a solid. The work of adhesion Wa corresponding to wet energy can be thus obtained.

$$Wa = \gamma_L (1 + \cos \theta) \qquad \text{Equation 3}$$

The work of adhesion Wa in the present disclosure can be obtained in the following manner.

A solid image is formed on the entire of a 10 cm×10 cm aluminum plate (available form "IIDA KINSHO") at 23±0.5 degrees C. and 50±5 percent RH using Auto Body Printer (available from Ricoh Digital Painting Company, Ltd.) with an amount of ink applied at 1.0 g/m$^2$. The ink applied is dried at 50 degrees for 30 seconds with the heated-wind drier mounted on the head module to obtain an ink layer.

Next, highly pure water is applied onto this ink layer to measure the contact angle. The found value of the contact angle is assigned to the equation 3 to calculate the work of adhesion Wa. The contact angle is measured with DMo-501 (manufactured by Kyowa Interface Science Co., LTD.). The value of the contact angle at 1,000 ms after the contact between the droplet and the ink layer is adopted.

The static surface tension $\gamma_L$ of pure water was measured with a surface tensiometer DY-300 (manufactured by Kyowa Interface Science, Inc.) at 25 degrees C.

The surface tension $\gamma_s$ of a solid ink layer can be indirectly measured by the two-liquid method according to Fowkes-Owens model.

In this method, the contact angle of a solid is measured using two types of probe liquids whose dispersive component and polar component are known. The two types of probe liquids can be a combination of pure water having a high polar component and methylene iodide having a high dispersive component.

Table 1 shows the components of surface free energy of pure water and diiodomethane.

TABLE 1

| Probe liquid | Dispersive component $\gamma_L^d$ (mJ/m²) | Polar component $\gamma_L^p$ (mJ/m²) | Surface free energy $\gamma_L^d + \gamma_L^p$ (mJ/m²) |
|---|---|---|---|
| Pure water | 21.8 | 51.0 | 72.8 |
| Diiodemethane | 48.3 | 2.5 | 50.8 |

As shown in the equations 4 and 5, the surface free energy $\gamma_S$ of a solid and the surface free energy $\gamma_L$ of a liquid each are expressed by the sum of the dispersive component $\gamma^d$ and the polar component $\gamma^p$.

$$\gamma_S = \gamma_S^d + \gamma_S^p \quad \text{Equation 4}$$

$$\gamma_L = \gamma_L^d + \gamma_L^p \quad \text{Equation 5}$$

The work of adhesion Wa represented by the equation 3 above can be expressed as the root mean square of a solid and liquid as shown in the equation 6.

$$Wa = 2\sqrt{\gamma_L^d \gamma_S^d} + 2\sqrt{\gamma_L^p \gamma_S^p} \quad (6)$$

Therefore, Young-Dupre 7 is obtained from the equations 4, 5, and 6.

$$\gamma_L(1+\cos\theta) = 2\sqrt{\gamma_L^d \gamma_S^d} + 2\sqrt{\gamma_L^p \gamma_S^p} \quad (7)$$

The equation 7 can be modified by dividing both sides by $2\sqrt{\gamma_L^d}$ to obtain the equation 8.

$$\frac{Wa}{2\sqrt{\gamma_L^d}} = \sqrt{\gamma_s^d} + \sqrt{\gamma_s^p}\sqrt{\frac{\gamma_L^p}{\gamma_L^d}} \quad (8)$$

Figure 2:
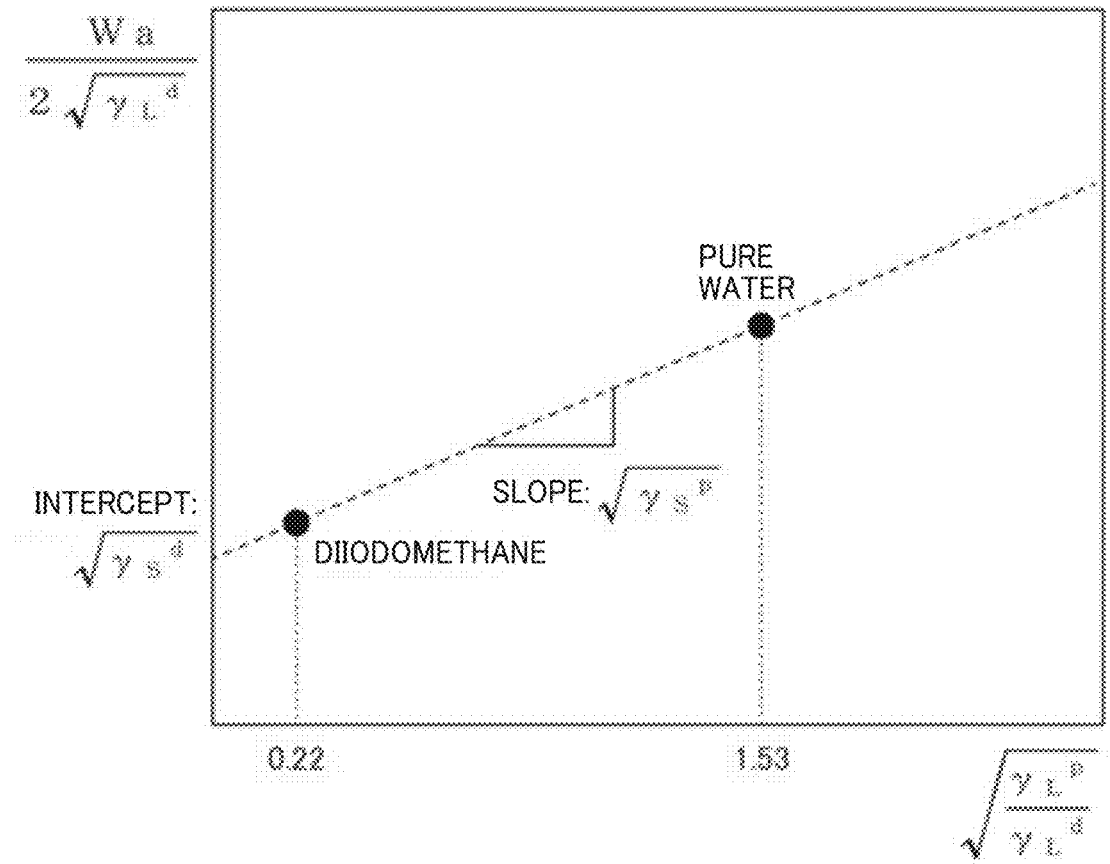
FIG. 2 is a graph illustrating a method of obtaining surface free energy of a solid ink layer based on Fowkes-Owens model.

The surface free energy $\gamma_S$ of an ink layer can be obtained using the equation 8. The above is described with reference to FIG. 2.

The contact angle of two types of probe liquids shown in Table 1, pure water and diiodemethane, on an ink layer are measured. The contact angle is defined as the value obtained at 1,000 ms after dripping of the probe liquid. The average of five measurements is adopted. Based on equation 8, the dispersive component $\gamma_S^d$ of the surface free energy of an ink layer is obtained from the intercept of the graph in FIG. 2. The polar component $\gamma_S^p$ of the surface free energy of the ink layer is obtained from the slope. The surface free energy $\gamma_S$ is obtained as the sum of the dispersive component $\gamma_S^d$ and polar component $\gamma_S^p$.

Coloring Material

The coloring material may include any pigment.

The pigment includes an inorganic pigment and organic pigment. These can be used alone or in combination. Also, mixed crystals are usable as the pigments.

Examples of the pigments include, but are not limited to, black pigments, yellow pigments, magenta pigments, cyan pigments, white pigments, green pigments, orange pigments, and gloss or metallic pigments of gold, silver, and others.

Carbon black manufactured by known methods such as contact methods, furnace methods, and thermal methods can be used as the inorganic pigment in addition to titanium oxide, iron oxide, calcium carbonate, barium sulfate, aluminum hydroxide, barium yellow, cadmium red, and chrome yellow.

Specific examples of the organic pigments include, but are not limited to, azo pigments, polycyclic pigments (e.g., phthalocyanine pigments, perylene pigments, perinone pigments, anthraquinone pigments, quinacridone pigments, dioxazine pigments, indigo pigments, thioindigo pigments, isoindolinone pigments, and quinophthalone pigments), dye chelates (e.g., basic dye type chelates and acid dye type chelates), nitro pigments, nitroso pigments, and aniline black. Of these pigments, pigments having high affinity with solvents are preferable. Hollow resin particles and hollow inorganic particles can also be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2 {Permanent Red 2B(Ca)}, 48:3, 48:4, 49:1, 52:2, 53:1, 57:1 (Brilliant Carmine 6f), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63; C.I. Pigment Green 1, 4, 7, 8, 10, 17, 18, and 36.

The proportion of the coloring material is not particularly limited and can be suitably selected to suit to a particular application.

It is preferably from 0.1 to 15 percent by mass, more preferably from 1 to 10 percent by mass, and furthermore preferably from 2 to 5 percent by mass to the entire of the ink to enhance the image density, fixability, and discharging stability.

Ink can be obtained by dispersing a pigment. The pigment can be dispersed in ink by a method of introducing a hydrophilic functional group into a pigment to prepare a self-dispersible pigment, a method of coating the surface of a pigment with a resin followed by dispersion, or a method of using a dispersant to disperse a pigment, and other methods.

One way of preparing a self-dispersible pigment by introducing a hydrophilic functional group into the pigment mentioned above is to add a functional group such as a sulfone group and carboxyl group to a pigment (e.g., carbon) to disperse the pigment in water.

One way of dispersing a pigment by coating the surface of the pigment with resin is to encapsulate pigment particles in microcapsules for dispersion in water. This microencapsulated pigment is also referred to as a resin-coated pigment. The resin-coated pigment particles in ink are not necessarily entirely coated with resin.

Pigment particles not partially or wholly covered with resin may be dispersed in ink unless such particles have an adverse impact.

One way of using a dispersant for dispersing a pigment is to use a known dispersant of a small or large molecular weight, typically a surfactant.

As the dispersant, an anionic surfactant, a cationic surfactant, a nonionic surfactant, an amphoteric surfactant, or others can be selected depending on a pigment.

A nonionic surfactant (RT-100, manufactured by TAKEMOTO OIL & FAT CO., LTD.) and a formalin condensate of naphthalene sodium sulfonate are suitably used as the dispersant.

Those can be used alone or in combination.

Pigment Dispersion

The ink can be obtained by mixing a pigment with materials such as water and an organic solvent. It is also possible to mix a pigment with water, a dispersant, and other substances to prepare a pigment dispersion and thereafter mix the pigment dispersion with materials such as water and an organic solvent to manufacture an ink.

The particle size of this pigment dispersion is adjusted by mixing or dispersing with water, a pigment, a pigment dispersant, and other optional components. Dispersing devices can be used for dispersion.

The particle diameter of the pigment in the pigment dispersion has no particular limit. For example, when the maximum frequency is preferably from 20 to 500 nm and more preferably from 20 to 150 nm in the maximum number conversion, dispersion stability of the pigment is enhanced and discharging stability and the image quality such as image density are also improved. The particle diameter of a pigment can be analyzed using a particle size analyzer (Nanotrac Wave-UT151, manufactured by MicrotracBEL Corp).

The proportion of the pigment in the pigment dispersion is not particularly limited and can be suitably selected to suit a particular application. It is preferably from 0.1 to 50 percent by mass and more preferably from 0.1 to 30 percent by mass to enhance the discharging stability and image density.

It is preferable that the pigment dispersion be filtered with an instrument such as filter and a centrifuge to remove coarse particles followed by deaerating.

Resin

The resin refers to resin particles dispersed in water as a resin emulsion and optionally contains a dispersant such as a surfactant.

The other optional resins are not particularly limited and can be suitably selected to suit to a particular application. Examples include, but are not limited to, acrylic-based resins, urethane-based resins, vinyl acetate-based resins, styrene-based resins, butadiene-based resins, styrene-butadiene-based resins, vinylchloride-based resins, acrylic styrene-based resins, and acrylic silicone-based resins. Of these, urethane resins are preferable.

The resin can be synthesized or procured. These resins can be used alone or two or more types of the resin particles.

The resin mentioned above may have any glass transition temperature Tg, which can be suitably selected to suit to a particular application. It is preferably from −40 to 45 degrees C. and more preferably from −20 to 20 degrees C. A Tg of −40 or higher degrees C. forms an ink layer with a high mechanical strength. A Tg of 45 degrees C. or lower enhances the force of attachment between particles and particles and a printing medium in drying, thus enhancing water resistance, abrasion resistance, and blocking resistance.

The Tg of the urethane resin has no particular limit and can be suitably selected to suit to a particular application. It is preferably from −40 to 45 degrees C. and more preferably from −20 to 20 degrees C. A low T significantly provides high elasticity and improves attachment in general. Using a urethane resin emulsion of −20 or higher degrees C. results in a printed surface free of stickiness after drying and printed matter with high resistance. Less sticky printed matter stacked on each other is associated with less occurrence of blocking, a phenomenon of the printed surface of printed matter adhering to other members. A high Tg invites low elasticity, thus tending to cause an ink layer to crack over time. Using a urethane resin emulsion of 20 or lower degrees C. can maintain the quality of an ink layer for a long period of time and avoid applying excessive heat to dry printed matter. Thus, the energy cost decreases and printing media can be prevented from being damaged by heat.

The melting point of the resin has no particular limit and can be suitably selected to suit to a particular application. It is preferably from 20 to 80 degrees C. and more preferably from 40 to 60 degrees C.

The melting point of the urethane resin has no particular limit and can be suitably selected to suit to a particular application. It is preferably from 20 to 80 degrees C. and more preferably from 40 to 60 degrees C.

A melting point of 20 or higher degrees C. enhances discharging stability. A melting point of 80 or lower degrees C. firmly attaches resins to each other or resins to a printing medium in heat drying, thus improving fixability.

The Tg and melting point of the resin can be adjusted by the type and content of monomers constituting the resin.

The Tg can be measured by differential scanning calorimetry (DSC) according to JIS K 6900 format.

In the case of a resin dispersion, the dispersion is dried and the dried dispersion is measured regarding Tg and melting point in the following manner.

A total of 5 g of a resin dispersion was uniformly placed in a petri dish made of tetrafluoroethyleneperfluoro alkyl vinylether (PFA) copolymer. The resin dispersion was dried at 50 degrees C. for one week to obtain dried matter of the resin dispersion.

The dried resin dispersion was analyzed with a differential scanning calorimeter (DSC) (Q2000, manufactured by TA Instruments) to determine its thermal properties under the following measuring conditions. Endothermic and exothermic energy and temperature are plotted in a graph. The characteristic inflection observed in the first temperature rise is determined as the glass transition temperature Tg. In addition, the value obtained from the DSC curve by the midpoint method is used as the Tg.

The melting point is defined as the extrapolated onset temperature obtained in the second temperature rise.

The extrapolated onset temperature is regulated according to JIS K-7121, referring to the temperature at the intersection of the straight line of the baseline on the low temperature side extending to the high temperature side and the tangent drawn to the curve on the low temperature side of the melting peak at the point where the slope is maximum. Heat absorption up to the melting peak temperature starts at this onset temperature.

Measuring Conditions

Sample container: Aluminum sample pan (with a lid)

Quantity of sample: 5 mg

Reference: Aluminum sample pan (empty container)
Atmosphere: nitrogen (rate of flow: 50 ml/min)
Onset temperature: −80 degrees C.
Rate of first temperature rise: 10 degrees C./min
Ending temperature: 130 degrees C.
Holding time: one minute
Rate of temperature falling: 10 degrees C./min
Ending temperature: −80 degrees C.
Holding time: 5 minutes
Rate of second temperature rise: 10 degrees C./min
Ending temperature: 130 degrees C.

The proportion of the resin is not particularly limited and can be suitably selected to suit to a particular application. It is preferably from 0.5 to 10 percent by mass and more preferably from 3 to 10 percent by mass in solid to the entire of the ink.

A proportion of 0.5 or greater percent by mass ensures high abrasion resistance. A proportion of 10 or less percent by mass advantageously reduces aggregation of emulsion particles, resulting in high storage stability.

The proportion of the resin particles to resin emulsion is generally preferably from 10 to 70 percent by mass.

The 50 percent cumulative volume particle diameter D50 of the resin particles in the resin emulsion is preferably from 10 to 500 nm, more preferably from 10 to 200 nm, and furthermore preferably from 10 to 100 nm as measured by dynamic light scattering (DLS). The resin emulsion is preferably free of coarse particles having a diameter of 0.5 or higher μm as measured by DLS.

A 50 percent cumulative volume particle diameter D50 of from 10 to 500 nm increases the contact portions between the solvent for an ink composition and the surface of the resin particles, enhancing the film-forming property of the resin particles, resulting in forming a continuous film of a robust resin. As a result, tough ink layer or printed matter is obtained.

The 50 percent cumulative volume particle diameter D50 is the particle diameter corresponding to 50 percent of the cumulative amount of volume distribution of the particle size distribution curve obtained by dynamic light scattering.

Specifically, a resin emulsion is diluted until the solid portion thereof is from 0.01 to 0.1 percent by mass obtain the particle diameter with Microtrac UPA (manufactured by Leeds & Nothup).

Organic Solvent

The organic solvent includes known water soluble organic solvents can be selected to suit to a particular application. Examples include, but are not limited to, a mono-valent alcohol, polyhydric alcohols, ethers such as polyol alkylethers and polyol arylethers, nitrogen-containing heterocyclic compounds, amides, amines, and sulfur-containing compounds. These can be used alone or in combination.

Specific examples of the mono-valent alcohol include, but are not limited to, methanol and ethanol.

Specific examples of the polyhydric alcohol include, but are not limited to, ethylene glycol, diethylene glycol, 1,2-propanediol, 1,3-propane diol, 1,2-butanediol, 1,3-butanediol, 1,4-butanediol, 2,3-butanediol, 3-methyl-1,3-butanediol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and petriol.

Specific examples of the ethers include, but are not limited to, polyhydric alcohol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether and polyhydric alcohol arylethers such as ethylene glycol monophenylether and ethylene glycol monobenzylether.

Specific examples of nitrogen-containing heterocyclic compounds include, but are not limited to, 2-pyrrolidone, N-methyl-2-pyrrolidone, N-hydroxyethyl-2-pyrrolidone, 1,3-dimethyl-2-imidazoline, F-caprolactam, and γ-butylolactone.

Specific examples of the amide include, but are not limited to, formamide, N-methyl formamide, N,N-dimethylformamide, 3-methoxy-N,N-dimethyl propionamide, and 3-buthoxy-N,N-dimethylpropionamide.

Specific examples of the amine include, but are not limited to, monoethanol amine, diethanol amine, and triethyl amine.

Specific examples of the sulfur-containing compounds include, but are not limited to, dimethyl sulphoxide, sulfolane, and thiodiethanol.

Also, for example, propylene carbonate and ethylene carbonate can be used as the organic solvent.

Of these, the organic solvents represented by Chemical Formula 1 below is preferable. An inclusion of the organic solvent represented by Chemical Formula 1 enhances the drying property of an ink layer, reducing ink dripping, enhancing the blocking resistance of the ink layer, and stably discharging an ink composition.

Chemical Formula 1

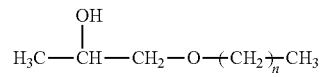

In Chemical Formula 1, n represents an integer of from 0 to 3.

Specific examples of the organic solvents represented by Chemical Formula 1 include, but are not limited to, propylene glycol mono-methyl ether (1-methoxy-2-propanol at n=0), propylene glycol mono-ethyl ether (1-ethoxy-2-propanol at n=1), propylene glycol mono-propyl ether (1-propoxy-2-propanol at n=2), and propylene glycol monobutyl-1-monobutylether (1-butoxy-2-propanol at n=3).

The organic solvent containing ethanol is more preferable to make the resin emulsion compatible with the organic solvent. This compatibility is associated with stable ink discharging.

Of the organic solvents, a water-soluble organic solvent with a boiling point of 250 or lower degrees C. is preferable to enhance the drying property in addition to acting as humectant.

The proportion of the organic solvent mentioned above in the ink is not particularly limited and can be suitably selected to suit to a particular application. It is preferably from 3 to 60 percent by mass and more preferably from 10 to 30 percent by mass to the entire of ink to quickly dry the ink and stably discharge it.

Water

There is no specific limitation to the water and it can be suitably selected to suit to a particular application. It includes pure water and ultra pure water such as deionized water, ultrafiltered water, reverse osmosis water, and distilled water.

The proportion of water in the ink is not particularly limited and can be suitably selected to suit to a particular application. It is preferably from 10 to 90 percent by mass and more preferably from 20 to 75 percent by mass to quickly dry the ink and stably discharge it.

Surfactant

The surfactant has no particular limit and can be suitably selected to suit to a particular application. For example, anionic surfactants, silicone-based surfactants, nonionic surfactants, amphoteric surfactants, and fluoro-surfactants are suitable. These can be used alone or in combination.

Silicone-Based Surfactant

The silicone-based surfactant is not particularly limited and can be suitably selected to a particular application. Of these, silicone-based surfactant not decomposed in a high pH environment is preferable.

Specific examples include, but are not limited to, side-chain modified polydimethyl siloxane, both-terminal modified polydimethyl siloxane, one-terminal-modified polydimethyl siloxane, and side chain both-terminal modified polydimethyl siloxane. Of these, silicon-based surfactants having a polyoxyethylene group or polyoxyethylene polyoxypropylene group as the modification group are particularly preferable because these demonstrate good properties as aqueous surfactants. The silicone-based surfactant includes a polyether-modified silicone-based surfactant, one of which is a compound in which a polyalkylene oxide structure is introduced into the side chain of the Si site of dimethyl siloxane.

Such surfactants can be synthesized or procured. Products of the silicone-based surfactant can be procured from manufacturers, such as BYK-Chemie GmbH, Shin-Etsu Silicone Co., Ltd., Dow Corning Toray Co., Ltd., NIHON EMULSION Co., Ltd., and Kyoeisha Chemical Co., Ltd.

The polyether-modified silicone-based surfactant is not particularly limited and can be suitably selected to suit to a particular application.

Specific examples of the products of the polyether-modified silicone-based surfactant include, but are not limited to, Silface SAG503A (manufactured by Nissin Chemical co., ltd.), KF-618, KF-642, and KF-643 (all manufactured by Shin-Etsu Chemical Co., Ltd.), EMALEX SS-5602 and EMALEX SS-1906EX (both manufactured by NIHON EMULSION Co., Ltd.), DOWSIL FZ-2105, DOWSIL FZ-2118, DOWSIL FZ-2154, DOWSIL FZ-2161, DOWSIL FZ-2162, DOWSIL FZ-2163, and DOWSIL FZ-2164 (all manufactured by Dow Corning Toray Co., Ltd.), BYK-33 and BYK-387 (both manufactured by BYK Chemie GmbH), and TSF4440, TSF4452, and TSF4453 (all manufactured by Toshiba Silicone Co. Ltd.).

In an embodiment of the present disclosure, polyether-modified siloxane compounds are preferable as the surfactant to obtain an ink minimally wettable to the ink repellent layer of the nozzle plate of an ink head, preventing defective discharging caused by ink attached to the nozzle, thus enhancing the discharging stability. A specific product is TEGO WET 270, manufactured by Evonik Degussa AG.

Fluorochemical Surfactant

The fluorochemical surfactant mentioned above is not particularly limited and can be suitably selected to suit to a particular application. It is preferably a fluorine-substituted compound having 2 to 16 carbon atoms and more preferably a fluorine-substituted compound having 4 to 16 carbon atoms.

Specific examples of the fluorochemical surfactant include, but are not limited to, perfluoroalkyl sulfonic acid compounds, perfluoroalkyl carboxylic acid compounds, perfluoroalkyl phosphoric acid ester compounds, adducts of perfluoroalkyl with ethylene oxide, and polyoxyalkylene ether polymer compounds having a perfluoroalkyl ether group in its side chain. These can be used alone or in combination.

Specific examples of the perfluoroalkyl sulfonic acid compound include, but are not limited to, perfluoroalkyl sulfonic acid and salts of perfluoroalkyl sulfonic acid.

Specific examples of the perfluoroalkyl carbonic acid compound include, but are not limited to, perfluoroalkyl carbonic acid and salts of perfluoroalkyl carbonic acid.

Specific examples of the polyoxyalkylene ether polymer compound having a perfluoroalkyl ether group in its side chain include, but are not limited to, sulfuric acid ester salts of polyoxyalkylene ether polymer having a perfluoroalkyl ether group in its side chain, and salts of polyoxyalkylene ether polymers having a perfluoroalkyl ether group in its side chain.

Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Of these, polyoxyalkylene ether polymer compounds having a perfluoroalkyl ether group in its side chain are preferable as the fluorochemical surfactant because these minimally foam.

Such fluorochemical surfactants can be procured.

Specific examples include, but are not limited to, SURFLON™ S-111, S-112, S-113, S-121, S-131, S-132, S-141, and S-145 (all manufactured by AGC SEIMI CHEMICAL CO., LTD.), FLUORAD FC-93, FC-95, FC-98, FC-129, FC-135, FC-170C, FC-430, and FC-431 (all manufactured by Sumitomo 3M Limited); MEGAFACE F-470, F-1405, and F-474 (all manufactured by DIC CORPORATION), ZONYL™ TBS, FSP, FSA, FSN-100, FSN, FSO-100, FSO, and FS-300 UR, Capstone™ FS-30, FS-31, FS-3100, FS-34, and FS-35 (all manufactured by The Chemours Company); FT-110, FT-250, FT-251, FT-400S, FT-150, and FT-400SW (all manufactured by NEOS COMPANY LIMITED); POLYFOX 136A, PF-156A, PF-151N, PF-154, and PF-159 (manufactured by OMNOVA SOLUTIONS INC.), and UNIDYNE DSN403N (manufactured by DAIKIN INDUSTRIES). Of these, FS-3100, FS-34, and FS-300 (manufactured by The Chemours Company), FT-110, FT-250, FT-251, FT-400S, FT-150, and FT-400SW (manufactured by NEOS COMPANY LIMITED), PF-151N (manufactured by OMNOVA SOLUTIONS INC.), and UNIDYNE DSN-403N (manufactured by DAIKIN INDUSTRIES) are particularly preferable in terms of good printing quality, in particular, coloring, and improvement on permeation to paper, wettability, and uniform dying property.

Amphoteric Silicone Surfactant

Specific examples of the amphoteric surfactants include, but are not limited to, lauryl aminopropionic acid salts, lauryl dimethyl betaine, stearyl dimethyl betaine, and lauryl dihydroxyethyl betaine.

Nonionic Surfactant

Specific examples of the nonionic surfactants include, but are not limited to, polyoxyethylene alkylene ethers, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

The nonionic surfactant can be procured.

Specific examples include, but are not limited, to TRITON™ HW-1000 (manufactured by Dow), Surfynol 104E, Surfynol 420, Surfynol 440, Surfynol SE-F, Surfynol 465, Surfynol SE-F, Surfynol 465, Surfynol 2502, and Enviro-Gem AD01 (all manufactured by Nissin Chemical co., ltd.), RHEODOL MO-60, EMAZOLE L-10V, RHEODOL AO-15V, and EMULGEN 102KG, manufactured by Kao Corporation).

Anionic Surfactant

Specific examples of the anionic surfactants include, but are not limited to, polyoxyethylene alkylether acetates, dodecyl benzene sulfonates, laurates, and salts of polyoxyethylene alkylether sulfates.

Hydrophilic-Lipophilic Balance (HLB) Value of Surfactant

The hydrophilic-lipophilic balance (HLB) value of a surfactant is preferably from 3 to 20 and more preferably from 5 to 15 in terms of the solubility of an ink and the surface free energy of a layer of the ink.

The HLB value indicates hydrophilicity and hydrophobicity of a surfactant. A smaller HLB is associated with a higher hydrophobicity of a surfactant. A larger HLB is associated with a higher hydrophilicity of a surfactant.

The content of the surfactant in the ink mentioned above is adjusted to control the polar component $\gamma_s^p$ of the surface free energy of an ink layer obtained by drying the ink within a range of from 3.5 to 20 mJ/m$^2$.

The HLB value is calculated from the sum of the formula weight of the hydrophilic sites of a target surfactant and the molecular weight of the surfactant according to the following equation 9 of Griffin's method.

$$HLB \text{ value}=20\times(\text{sum of the formula weight of hydrophilic sites/molecular weight}) \quad (9)$$

Of these surfactants, silicone surfactants are preferable. Also, modified siloxane-based surfactants are preferable because it has organic groups introduced to adjust the function of the surfactant and the solution characteristics to a water-soluble organic solvent. Of these, polyether-modified siloxane-based surfactants using a polyether group as an organic group are preferable. It can control the HLB value of a surfactant by adjusting the number of ethylene oxide groups and propylene oxide groups that constitute polyether groups. Also, polyether-modified siloxane-based surfactants are compatible in ink, stably being present without separation over time.

The proportion of the surfactant to the entire of the ink mentioned above is preferably from 0.001 to 5 percent by mass and more preferably from 0.5 to 3 percent by mass.

A proportion of 0.001 to 5 percent by mass produces an ink minimally wet on the ink repelling film of the nozzle plate of an ink head. Therefore, the ink is prevented from adhering to the nozzle and being defectively discharged, enhancing discharging stability.

Other Components

There is no specific limitation to the selection of the other components. For example, foam inhibitors (defoaming agent), pH regulators, preservatives and fungicides, chelate reagents, corrosion inhibitors, anti-oxidants, ultraviolet absorbers, oxygen absorbers, and photostabilizing agents can be selected.

Foam Inhibitor (Defoaming Agent)

The defoaming agent is not particularly limited and it can be suitably selected to suit to a particular application. It includes, but is not limited to, a silicon-based defoaming agent, polyether-based defoaming agent, aliphatic acid alcohol-based defoaming agent, and aliphatic acid ester-based defoaming agent. Aliphatic acid alcohol-based defoaming agent includes an aliphatic dialcohol-based defoaming agent (aliphatic dialcohol-based surfactant).

These can be used alone or in combination.

The proportion of the foam inhibitor to the entire of ink is preferably from 0.01 to 10 percent by mass and more preferably from 0.1 to 5 percent by mass. A proportion of 0.01 or greater percent by mass reduces foaming. A proportion of 10 percent or less by mass reduces foaming, making ink properties such as viscosity and particle diameter suitable.

pH Regulator

As the pH regulator, any regulator capable of adjusting the pH to 7 to 11 without an adverse impact on prescribed ink is suitable.

Specific examples include, but are not limited to, alcohol amines, hydroxides of alkali metal elements, ammonium hydroxides, phosphonium hydroxides, and carbonates of alkali metal elements. A pH of less than 7 and greater than 11 increasingly dissolves an inkjet head and an ink supplying unit, leading to modification, leakage, low discharging performance of the ink.

Specific examples of the alcohol amines include, but are not limited to, diethanolamine, triethanolamine, and 2-amino-2-ethyl-1,3-propanediol.

Any proportion of the pH regulator in an ink is allowed. It can be suitably selected to suit to a particular application as long as it can achieve a desired pH.

Preservatives and Fungicides

Specific examples of the preservatives and fungicides include, but are not limited to, dehydrosodium acetate, sodium sorbinate, sodium 2-pyridine thiol-1-oxide, sodium benzoate, and pentachlorophenol sodium.

Corrosion Inhibitor

Specific examples of the corrosion inhibitor include, but are not limited to, acid sulfite, thiosodium sulfate, antimony thioglycollate, diisopropyl ammonium nitrite, pentaerythritol tetranitrate, and dicyclohexyl ammonium nitrite.

Anti-Oxidant

Specific examples of the anti-oxidants include, but are not limited to, phenol-based anti-oxidants (including hindered phenol-based anti-oxidants), amino-based anti-oxidants, sulfur-based anti-oxidants, and phosphorous-based anti-oxidants.

Ink Properties

Properties of the ink are not particularly limited and they can be suitably selected to suit to a particular application. The ink preferably has properties, such as viscosity, surface tension, and pH, in the following ranges.

The ink preferably has a viscosity of from 5 to 30 mPa·s and more preferably from 5 to 25 mPa·s at 25 degrees C. to enhance the print density and text quality and achieve good dischargeability. Viscosity can be measured by an instrument such as a rotatory viscometer (RE-80L, manufactured by TOKI SANGYO CO., LTD.). The measuring conditions are as follows:

Standard cone rotor (1°34'×R24)
Sample liquid amount: 1.2 mL
Rate of rotations: 50 rotations per minute (rpm)
25 degrees C.
Measuring time: three minutes.

The surface tension of ink is preferably 35 mN/m or less and more preferably 32 mN/m or less at 25 degrees C. because the ink suitably levels on a printing medium and the ink dries quickly.

pH of the ink is preferably from 7 to 12 and more preferably from 8 to 11 to prevent corrosion of the metal material in contact with liquid.

Method of Manufacturing Ink

The ink is manufactured by dispersing or dissolving the water, coloring material, resin, organic solvent, and other optional components such as the surfactant and other components in water followed by stirring and mixing.

For stirring and mixing, devices such as a sand mill, a homogenizer, a ball mill, a paint shaker, an ultrasonic wave dispersing device, a stirrer having a stirring wing, a magnetic stirrer, and a high performance dispersing device are used.

The ink of the present disclosure can be suitably used for inkjet printing or spray painting.

The ink for inkjet printing is used in any printer having an inkjet head such as a piezoelectric element type in which ink droplets are discharged by transforming a vibration plate forming the wall of the ink flowing path using a piezoelectric element as a pressure generating device to press the ink in the ink flowing path as described in Unexamined Japanese Unexamined Patent Application Publication No. H2-51734; a thermal type in which bubbles are produced by heating ink in the ink flowing path with a heat element as described in Unexamined Japanese Patent Application Publication No. S61-59911; and an electrostatic type in which ink droplets are discharged by changes of the volume in the ink flowing path caused by transforming a vibration plate that forms the wall surface of the ink flowing path by a force of electrostatic generated between the vibration plate and the electrode while the vibration plate and the electrode are provided facing each other as described in Unexamined Japanese Patent Application Publication No. H6-71882.

Ink Set

The ink of the present disclosure as at least one of the pigment ink mentioned above can be combined with other pigment inks or clear ink. This combination can be used as an ink set.

For the pigment ink, one or more inks can be selected from cyan, magenta, yellow, black, and other colors. As the pigment ink constituting an ink set, multiple inks having the same hue as the ink mentioned above with a different content of pigment can be used. Examples of such multiple inks include black, pale black, gray, and pale gray inks. The multiple inks are not limited thereto.

Accommodating Unit

The accommodating unit of the present embodiment, or ink cartridge or ink container, includes a container, the ink of the present disclosure housed in the container, and other optional members.

The accommodating unit is not particularly limited. Any materials and dimensions like shape, size, and structure can be suitably selected to suit to a particular application.

Image Forming Apparatus and Image Forming Method

The image forming apparatus of the present disclosure includes the accommodating unit housing the ink of the present disclosure, an application device, and other devices such as, heating device, pre-processing device, post-processing device, feeding device for printing medium, device for conveying printing media, and device for ejecting printing media.

The image forming method of the present disclosure includes applying the ink and other processes such as heating, pre-processing, post-processing, feeding printing media, conveying print media, and ejecting printing media.

Preferably, in one embodiment, the ink is used for inkjetting, and the image forming apparatus is an inkjet printer. Preferably, in another embodiment, the ink is used for spray painting, and the image forming apparatus is a spray painter.

Application Device and Applying

The application device applies the ink of the present disclosure, preferably substantially perpendicularly, to the painting surface of a printing medium.

In the application process, the ink of the present disclosure is applied, preferably substantially perpendicularly, to the printing surface of a printing medium. The application device suitably executes the application.

"Substantially perpendicularly to the printing surface of a printing medium" means $-10°$ to $10°$, preferably $-5°$ to 5, to a normal to the printing surface.

In the case of a rough printing medium, for example, a normal is substantially perpendicular to the printing surface assumed to be flat or smooth, ignoring the irregularity with a height of less than 1 percent of the long side of the printing medium.

Printing Medium

The printing medium is not particularly limited. Any printing medium can be suitably selected to suit to a particular application.

Specific examples include, but are not limited to, wall paper, floor materials, building materials such as tile, wall of buildings, traffic signs, vehicles such as automobiles including buses, taxis, and trucks, and trains. The printing medium is not limited to that with a flat surface. It includes a substrate with a three-dimensional plane and the printing medium mentioned above with irregularities on the printing surface.

In the present disclosure, "printing medium" is the same as "substrate".

The material of the printing medium is not particularly limited. Materials such as paper including plain paper, gloss paper, and special paper, and cloth are usable. Also, quality images can be formed on a non-permeating substrate. In addition, substrates of paper or cloth treated with water-repelling or ceramic material made by baking inorganic materials at high temperatures can be used.

The non-permeating substrate has a surface with low moisture permeability and absorbency. It includes a material having a number of hollow spaces inside that are not open to the outside. To be more quantitative, the substrate has a water-absorbency of 10 or less $mL/m^2$ between the start of the contact and 30 $msec^{1/2}$ after the start according to Bristow's method.

Specific examples of the non-permeating substrate include, but are not limited to, plastic film such as vinyl chloride resin film, polyethylene terephthalate (PET) film, polypropylene film, polyethylene film, and polycarbonate film, metal such as yellow copper, iron, aluminum, SUS, and copper, and non-metal substances treated with metal coating by a method such as deposition.

The metal includes the one having a surface-treated printing surface. One way of surface-treating is primer coating.

The ink of the present disclosure can be suitably applied to a printing device employing inkjet printing, such as a printer, facsimile machine, photocopier, multifunction peripheral (serving as a printer, a facsimile machine, and a photocopier), and solid freeform fabrication device such as a 3D printer and additive manufacturing device.

The usage of the ink is not particularly limited and can be suitably selected to suit to a particular application. For example, the ink can be used for printed matter, a paint, a coating material, and foundation. The ink can be used to produce two-dimensional text and images. They also can be used as a material for solid fabrication for manufacturing a three-dimensional image (or solid freeform fabrication object). Since the ink mentioned above quickly dries, printing is possible even in the case that the printing surface of the printing medium mentioned above is placed substantially horizontally against the direction of gravity and the ink for inkjetting mentioned above is perpendicular discharged to the printing surface of the printing medium. In addition, the printed ink layer maintains water resistance, shock resistance, and cohesiveness for an extended period. Therefore, this ink is particularly suitable for printing ink layers on the side of a vehicle that involves a concern about abrasion to the ink layers during car-washing.

In the present disclosure, "recording and "printing" are the same.

Other Optional Device and Other Optional Process

Heating Device and Heating

The heating device heats the print surface and the opposite surface of a printing medium.

In the heating, the heating device suitably heats the printing surface and the opposite. This heating can be conducted before, in the middle of, or after printing.

The heating device is not particularly limited. For example, a fan heater and an infra-red heater can be used.

The heating device executes the heating to dry the ink printed on the printing medium mentioned above.

Pre-Processing Device and Pre-Processing

The pre-processing device applies a pre-processing fluid to a printing medium before the ink is applied thereto.

In the pre-processing, the pre-processing device suitably applies the processing fluid mentioned above to the printing medium mentioned above.

The pre-processing device preferably includes the pre-processing fluid container containing the pre-processing fluid mentioned above and a pre-processing fluid discharging head.

The method of discharging the pre-processing fluid is preferably inkjet printing. It includes blade coating, roll coating, and spray coating.

Pre-Processing Fluid

The pre-processing fluid is applied to a printing medium prior to ink application.

The pre-processing fluid contains a multivalent metal salt and other optional substances such as water, an organic solvent, a surfactant, a defoaming agent, a pH regulator, a preservatives and fungicides, and a corrosion inhibitor. Water, the organic solvent, the surfactant, the defoaming agent, the pH regulator, the preservatives and fungicides, and the corrosion inhibitor can be the same material as those for use in the ink. Also, other materials for use in known processing liquid can be used.

Multivalent Metal Salt

The multivalent metal salt associates with the coloring material in the ink by an electric charge action to form an aggregate of the coloring material, separating the coloring material from the liquid phase to promote fixing onto a printing medium. In addition, this multivalent metal salt in a pre-processing fluid reduces the occurrence of beading even on a printing medium with a low ink-absorptivity, which leads to forming quality images.

The multivalent metal salt is not particularly limited and can be suitably selected to suit to a particular application. The multivalent metal salt can be used alone or in combination.

The multivalent metal salt is constituted of particular multivalent metal salt ions and anionic ions bonded with these multivalent metal ions.

Specific examples of the multivalent metal salts include, but are not limited to, a magnesium salt, calcium salt, nickel salt, aluminum salt, boron salt, and zinc salt. Of these, the magnesium salt and calcium salt are preferable.

Specific examples of the calcium salt and magnesium salt include, but are not limited to, calcium chloride, magnesium chloride, calcium bromide, magnesium bromide, calcium nitrate, magnesium nitrate, and magnesium sulfate.

The pre-processing fluid may contain an organic acid metal salt in addition to the above.

Specific examples of the organic acid metal salt include, but are not limited to, calcium salts and magnesium salts of pantothenic acid, propionic acid, ascorbic acid, acetic acid, and lactic acid.

The content of the multivalent metal salt is preferably from 10 to 40 percent by mass to the entire of the pre-processing fluid. A proportion of 10 or more percent by mass enhances aggregation effects on the solid portion, thus furthermore reducing the occurrence of color bleed and beading. A proportion of 40 or less percent by mass can reduce precipitation of a multivalent metal salt during water evaporation.

Post-Processing Device and Post-Processing

The post-processing device applies a post-processing fluid to a printing medium. In the post-processing, the post-processing device applies a post-processing fluid to a printing medium.

The post-processing device preferably includes the post-processing fluid container that contains the post-processing fluid mentioned above and a post-processing fluid discharging head.

The method of discharging the post-processing fluid is preferably inkjet printing. It includes other methods such as blade coating, roll coating, and spray coating.

Post-Processing Fluid

The post-processing fluid forms a transparent layer. It is preferable to select and mix substances such as an organic solvent, water, resin, surfactant, defoaming agent, pH regulator, preservatives and fungicides, and corrosion inhibitor to prepare the post-processing fluid.

Such an organic solvent, water, resin, surfactant, defoaming agent, pH regulator, preservatives and fungicides, and corrosion inhibitor may be the same materials as those for use in the ink for inkjetting. Materials for use in known post-processing fluid can be also used.

The post-processing fluid can be applied to the entire printing region formed on a printing medium or only the region on which an image by ink for inkjetting is formed.

Inkjet Printing Device

An inkjet printing device, an embodiment of the present disclosure, is described below.

The inkjet printing device includes an ink accommodating unit that contains the ink for inkjetting, a discharging head for discharging the ink as an application device, and other optional devices such as a heating device, pressure chamber, pre-processing device, post-processing device, and device for feeding, conveying, or ejecting a sheet.

In addition, the inkjet printing device includes both a serial type device with a movable liquid discharging head and a line type device with a fixed liquid discharging head, unless otherwise specified.

Furthermore, other than a desktop type printer, this inkjet printing device includes a device capable of printing images on a A0 printing medium and a continuous printer capable of using continuous paper reeled in a roll-like form as a printing substrate.

In addition, the inkjet printing device is not limited to those that produce meaningful visible images such as text and figures with the ink for inkjetting. Devices for creating patterns like geometric design and 3D images are included.

Ink Accommodating Unit

The ink accommodating unit accommodates the ink for inkjet printing.

The ink accommodating unit can be any member that can house the ink for inkjetting. It includes an ink container and ink tank, for example.

The ink container contains the ink and may include other optional suitably-selected members.

The container is not particularly limited. Any form, any structure, any size, and any material can be selected to suit to a particular application. For example, it includes a container having at least an ink bag formed of materials such as aluminum laminate film and resin film.

The ink tank includes a main tank and a sub-tank, for example.

Discharging Device and Discharging

The discharging head includes a nozzle plate with a nozzle surface with nozzles, from which the ink for inkjetting printing of the present disclosure is discharged. The head may include other optional members such as a stimulus-generating member.

Discharging refers to discharging the ink for inkjet printing mentioned above.

In the discharging, it is preferable to discharge the inkjet ink perpendicularly to the printing surface of a substrate placed substantially horizontal to the direction of gravity.

Nozzle Plate

The nozzle plate includes a nozzle substrate and an ink repellent film on the nozzle substrate.

The nozzle substrate has nozzles or orifices, whose number, shape, size, material, and structure are not particularly limited and can be suitably selected to suit to a particular application.

The nozzle substrate has an ink discharging surface and a liquid chamber bonding surface on the opposite side of the ink discharging surface. The inkjet ink is discharged from the ink discharging surface side through the orifices.

The ink repellent film is formed on the surface on the ink discharging side of the nozzle substrate, facing the substrate.

The planar shape of the nozzle substrate is not particularly limited and can be suitably selected to suit to a particular application. Examples include a rectangle, a square, a rhombus, a circle, and an ellipse.

The cross section of the nozzle substrate may be a flat plate-like shape or plate-like shape.

The nozzle substrate can take any size and can be suitably selected to suit to the size of the nozzle plate.

There is no particular limit to the material for the nozzle substrate and it can be suitably selected to suit to a particular application.

Specific examples include, but are not limited to, Al, Bi, Cr, InSn, ITO, Nb, $Nb_2O_5$, NiCr, Si, $SiO_2$, Sn, $Ta_2O_5$, Ti, W, ZAO($ZnO+Al_2O_3$), and Zn. These can be used alone or in combination. Of these, stainless steel is preferable to prevent rust.

There is no specific limitation to stainless steel and it can be suitably selected to suit to a particular application. Specific examples include, but are not limited to, austenite-based stainless steel, ferrite-based stainless steel, martensite-based stainless steel, and precipitation curing-based stainless steel. These can be used alone or in combination.

At least the ink-discharging surface of the nozzle substrate may be subjected to oxygen plasma treatment for introducing a hydroxyl group, which enhances the attachability between the ink repellent film and the nozzle substrate.

The nozzle is not particularly limited with respect to the number, arrangement, spacing, the shape, size, and cross-sectional shape of the aperture and it can be suitably selected to suit to a particular application.

The arrangement of the nozzles is not particularly limited and can be suitably selected to suit to a particular. For example, nozzles can be equally spaced therebetween along the length direction of a nozzle substrate.

The nozzle arrangement depends on the type of ink discharged. It is preferably one or more lines of orifices and more preferably one to four lines.

The number of the nozzles per rank is not particularly limited and can be suitably select to suit to a particular application. For example, the number is preferably from 10 to 10,000 and more preferably from 50 to 500.

The pitch P, the minimum distance between the centers of adjacent orifices, is not particularly limited and can be suitably selected to suit to a particular application. It is preferably from 21 to 169 μm.

The shape of the nozzle aperture mentioned above is not particularly limited and can be suitably selected to suit to a particular application. Circular, elliptical, and square shapes are suitable. Of these, a circular shape is preferable to discharge ink droplets.

Ink Repellent Film

The ink repellent film preferably contains a silicone or fluorochemical resin in terms of ink repellency.

The ink repellent film is also referred to as a repellent ink material-containing film, silicone resin-containing film, and fluorochemical resin-containing film.

Silicone Resin

Silicone resin has a siloxane bonding of Si and O as a backbone. It can be procured in a form such as oil, resin, and elastomer. Silicone resin includes properties such as heat resistance, releasability, defoaming property, and adherence in addition to ink repellency. Silicone resin has types depending on how it cures: it cures at room temperature or by heating or ultraviolet irradiation. The type can be selected according to a method of manufacturing and usage.

A repellent film containing the silicone resin mentioned above can be formed on the nozzle surface (on the ink discharging side) by any method, which can be suitably selected to suit to a particular application. Specific examples include, but are not limited to, vapor deposition of liquid silicone resin, coating such as spin coating, dipping, and spray coating, and electrodeposition. Except for electrodeposition, a repellent ink layer can be formed by photoresisting the side opposite to the ink discharging side of the orifices and nozzle plate, masking with water-soluble resin to form an ink repellent layer, followed by peeling of the resist. Thus, the ink repellent layer containing silicone resin is formed on the discharging side of the nozzle plate. It is of note that a strong alkali stripping agent damages an ink repellent layer.

The ink repellent film containing the silicone resin can be thick suitable to suit to a particular application. A thickness of 0.1 to 5.0 μm is preferable and, 0.1 to 1.0 m, more preferable.

Fluorochemical Resin

Any fluorochemical resin can be used as the fluorochemical resin mentioned above. A fluorinated polyacrylate polymer or a polymer with a fluorinated heterocyclic structure in the main chain is preferable.

Ink repellent film made of a fluorinated polyacrylate polymer or polymer with a fluorinated heterocyclic structure in the main chain minimizes the surface free energy. As a result, even ink with low surface tension for use in the present disclosure can maintain a non-wettable state, which is preferable.

The proportion of fluorine in the fluorinated polyacrylate polymer is not particularly limited and can be suitably selected to suit to a particular application. It is preferably 10 percent by mass or more, more preferably 25 percent by mass or more, and furthermore preferably 50 percent by mass or more in terms of ink repellency (contact angle).

The fluorinated polyacrylate polymer can be synthesized or procured.

Specific examples of the products include, but are not limited to, Krytox® FSL and Krytox® FSH (both manufactured by Du Pont), FomblinZ, FLUOROLINKS10 (manufactured by Solvay Solexis), Optool DSX (manufactured by DAIKIN INDUSTRIES, LTD.), Moresco Phospharol A20H, Moresco Phospharol ADOH, and Moresco Phospharol DDOH (all manufactured by MORESCO Corporation), FluoroSurf FG5010, FluoroSurf FG5020, FluoroSurf FG5060, and FluoroSurf FG5070 (all manufactured by Fluoro Technology Co., Ltd.), CYTOP CTX-105 and CYTOP CTX-805 (both manufactured by AGC Inc.), Teflon™ AF1600 and Teflon™ AF2400 (manufactured by Du Pont).

The ink repellent film is formed of film of a compound containing the fluorinated acrylate ester polymer backbone in the molecule. An inorganic oxide layer can be provided between a nozzle plate and the ink repellent film in order to improve cohesiveness by allowing a large number of hydroxyl groups present as the bonding point with the compound containing a fluorinated acrylate ester polymer backbone in the molecule.

Specific examples of the material of the inorganic oxide layer include, but are not limited to, $SiO_2$ and $TiO_2$.

The average thickness of the inorganic oxide layer has no particular limit and can be suitably selected to suit to a particular application. For example, it is preferably from 0.001 to 0.2 μm and more preferably from 0.01 to 0.1 μm.

The method of forming an ink repellent film using a compound containing a fluorinated polyacrylate backbone in the molecule includes, but is not limited to, applying, printing, and vacuum deposition such as spin coating, roll coating, and dipping using a fluorinated solvent.

Specific examples of the fluorinated solvent include, but are not limited to, Novec (manufactured by 3M Japan Co., Ltd.), Vertrel (manufactured by DuPont), Galden (manufactured by Solvay Solexis), Afroude™ (fluorine-based solvent manufactured by Asahi Glass Co., Ltd.), and Fluorinert FC-75 (liquid containing perfluoro(2-butyltetrahydrofuran, manufactured by 3M Japan Ltd.).

Stimulus Generating Device

The inkjet ink can be discharged from the discharging head mentioned above by any method. One way of discharging is to generate a stimulus for applying ink with a stimulus generating member, discharging the ink.

The stimulus mentioned can be suitably selected to suit to a particular application and is not particularly limited. It includes, for example, heat (temperature), pressure, vibration, and light. These can be used alone or in combination. Of these stimuli, heat and pressure are preferable.

Examples of the stimulus generating member include, but are not limited to, a heater, a pressure member, a piezoelectric element, a vibrator, an ultrasonic oscillator, and light.

Specific examples include, but are not limited to a piezoelectric actuator such as a piezoelectric element, a thermal actuator utilizing phase change by boiled film of inkjet ink with an electric heat conversion element such as a heat generating resistance, a shape-memory alloy actuator utilizing metal phase change utilizing temperature changes, and an electrostatically actuated actuator. These can be used alone or in combination.

In the case that the stimulus is heat, thermal energy is applied to the ink in an ink discharging head in response to recording signals with a device such as a thermal head.

One way of using thermal energy is to generate bubbles in inkjet ink with heat energy followed by discharging droplets of the inkjet ink from the orifices of the nozzle plate due to the pressure of the bubbles.

In the case that the stimulus is pressure, for example, a voltage is applied to the piezoelectric element attached at the position referred to as a pressure chamber in the ink flow path in an ink discharging head, thus bending the piezoelectric element.

This bending shrinks the pressure chamber, thus discharging the inkjet ink droplets from the orifices of the ink discharging head.

Of these, in the case of pressure, applying a voltage to a piezoelectric element is preferable to discharge the inkjet ink.

Pressure Chamber

The pressure chamber is disposed corresponding to each of the nozzles provided to the nozzle plate. The pressure chamber is individual flow paths communicating with the nozzles and also referred to as ink flow path, pressure liquid chamber, pressure chamber, discharging chamber, and liquid chamber.

One aspect of the image forming apparatus of the present embodiment is described with reference to the drawing on a serial inkjet printing device.

Figure 3:
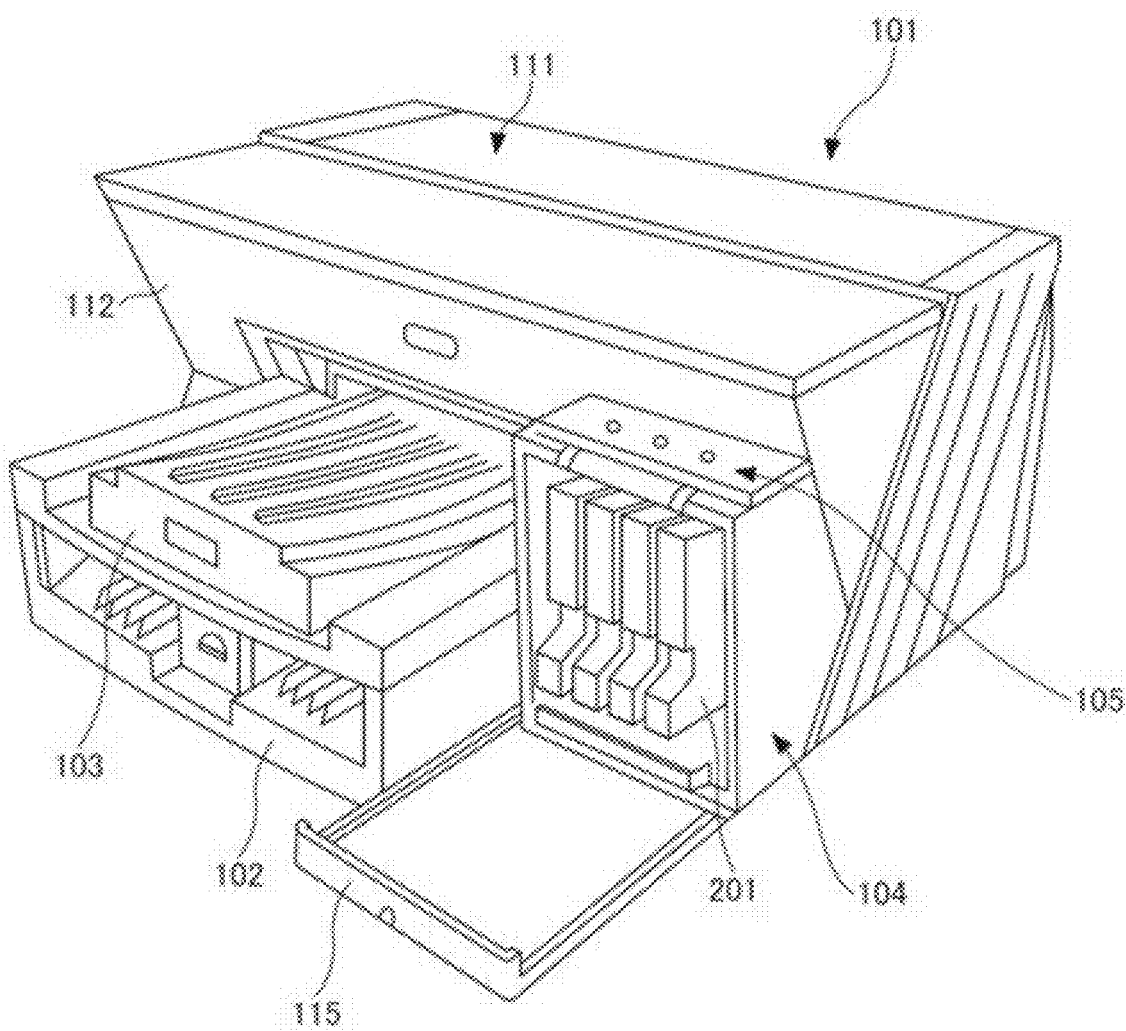
FIG. 3 is a schematic diagram illustrating an inkjet printing device as the image forming apparatus according to an embodiment of the present disclosure.

The inkjet printing device illustrated in FIG. 3 includes an inkjet printing unit 101, a sheet feeder tray 102 for feeding printing media to the inkjet printing unit 101, a sheet ejection tray 103 for storing the printing media on which images are formed (printed), and an ink cartridge inserting unit 104. On the upper surface of the ink cartridge inserting unit 104 is arranged an operation unit 105 including operation keys and a display. The ink cartridge inserting portion 104 has a front cover 115 openable and closable to detach and attach an ink cartridge 201.

Figure 4:
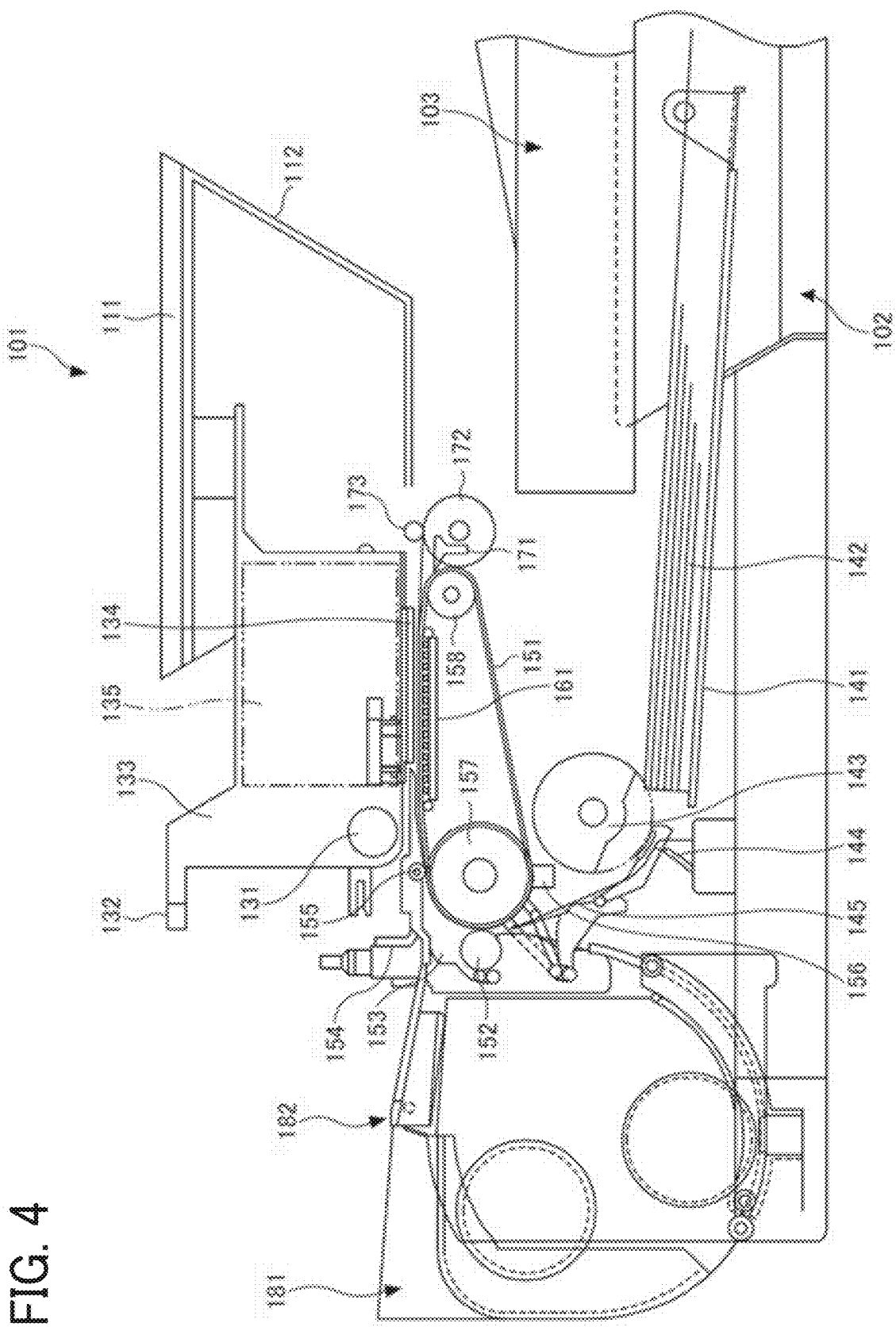
FIG. 4 is a diagram illustrating a cross-sectional view of the configuration of the inkjet printing device illustrated in FIG. 3.
Figure 5:
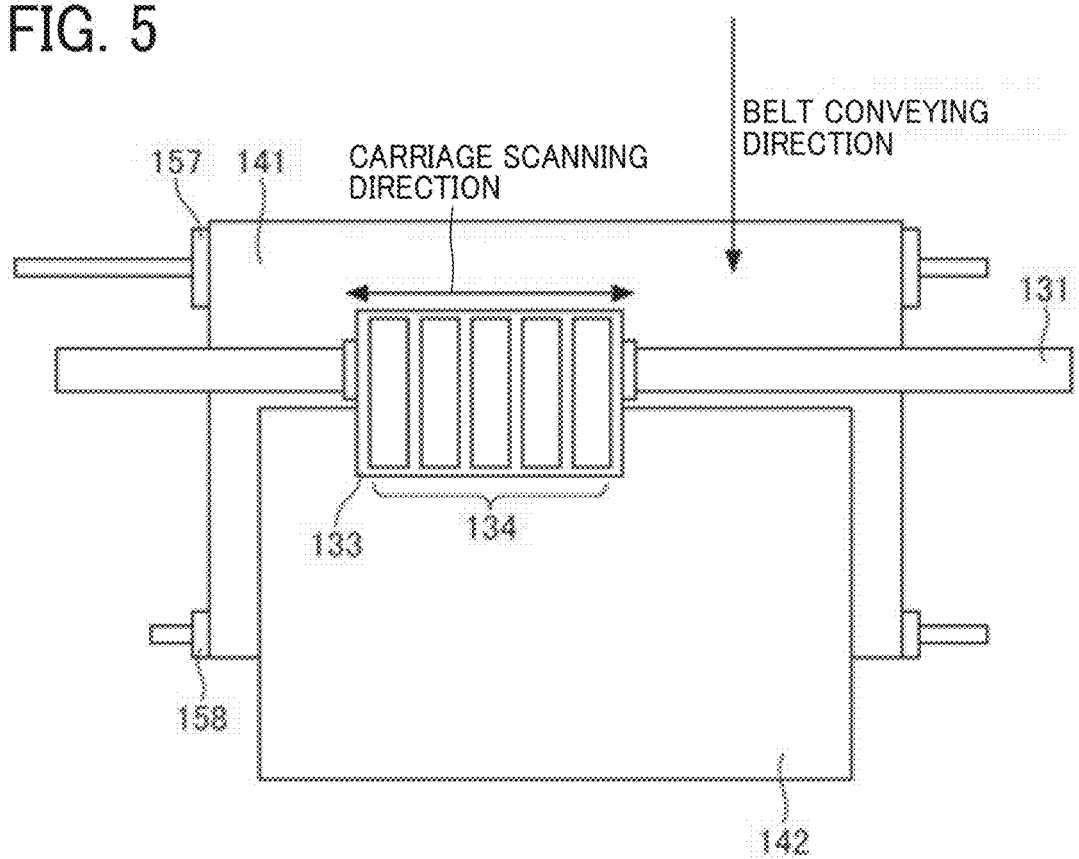
FIG. 5 is a diagram illustrating a schematic top view of part of the configuration of the inkjet printing device illustrated in FIG. 3.

Inside the inkjet printing unit 101, as illustrated in FIGS. 3 and 4, a guide rod 131 acting as a guiding member that laterally bridges side plates on the right hand side and left hand side and a stay 132 hold a carriage 133 slidably in the main scanning direction. A main scanning motor moves the carriage 133 in the direction indicated by the arrow in FIG. 5.

The carriage 133 includes a print head 134 having five inkjet printing heads that discharge inkjet ink droplets of each color of yellow (Y), cyan (C), magenta (M), black (Bk), and clear (Cl) while multiple ink discharging orifices are arranged in the direction crossing the main scanning direction with the ink droplet discharging direction downward.

As the heads for inkjet printing that form the print head 134, it is possible to use a device having an energy-generating device to discharge ink such as a piezoelectric actuator such as a piezoelectric element, a thermal actuator that utilizes the phase change caused by film boiling of liquid using an electric heat conversion element such as a heat element, a shape-memory alloy actuator that uses the metal phase change due to the temperature change, and an electrostatic actuator that uses an electrostatic force.

The carriage 133 has sub-tanks 135 as containers of each color for supplying each color ink to the print head 134. The inkjet ink is supplied and replenished to the sub-tanks 135 from the ink cartridge 201 mounted onto the ink cartridge inserting unit 104 via an ink supplying tube.

A sheet feeding unit for feeding a sheet 142 loaded on a sheet loader (pressure plate) 141 of the sheet feeder tray 102 includes a half-moon shape roller (sheet feeding roller 143) to separate and feed the sheet 142 one by one from the sheet loader 141 and a separation pad 144 made of a material having a large friction index and arranged facing the sheet feeding roller 143 while being biased towards the sheet feeding roller 143.

A conveyance unit for conveying the sheet 142 fed from the sheet feeding unit below the print head 134 includes a conveyor belt 151 that electrostatically adsorbs and conveys the sheet 142, a counter roller 152 that conveys the sheet 142 fed from the sheet feeding unit via a guide 145 while pinching the sheet 142 with the conveyor belt 151, a conveying guide 153 by which the sheet 142 moves on the conveyor belt 151 by changing the conveying direction of the sheet 142 being sent substantially vertically upward by substantially 90 degrees, and a front end pressing roller 155 biased towards the conveyor belt 151 by a pressure member 154. In addition, a charging roller 156 as a charger is disposed to charge the surface of the conveyor belt 151.

The conveyor belt 151 is an endless form belt, suspended between a conveying roller 157 and a tension roller 158 and rotatable in the belt conveying direction. This conveyor belt 151 includes, for example, a top layer serving as a substrate adsorption surface made of a resin material such as a copolymer (ETFE) of tetrafluoroethylene and ethylene with no resistance control treatment having a thickness of about 40 μm, and a bottom layer (moderate resistance layer, earth layer) made of the same material as the top layer with resistance control treatment with carbon. On the rear side of the conveyor belt 151, a guiding member 161 is disposed corresponding to the print region by the print head 134. Furthermore, as the sheet ejection unit for ejecting the sheet 142 on which an image is printed by the print head 134, there are provided a separation claw 171 for separating the sheet 142 from the conveyor belt 151, an ejection roller 172, and an ejection roller 173. The sheet ejection tray 103 is located below the ejection roller 172.

A duplex printing sheet feeding unit 181 is mounted in a detachable and attachable manner to the rear side of the inkjet printing unit 101. The duplex printing sheet feeding unit 181 takes in and reverses the sheet 142 that is returned by the reverse rotation of the conveyor belt 151 and feeds it again between the counter roller 152 and the conveyor belt 151. A bypass sheet feeding unit 182 is disposed on the upper surface of the duplex printing sheet feeding unit 181.

In this inkjet printing device, the sheet 142 is separated and fed from the sheet feeding unit one by one substantially vertically upward, guided by the guide 145, and transferred while being pinched between the conveyor belt 151 and the counter roller 152. Furthermore, the front end of the sheet 142 is guided by the conveying guide 153 and pressed against the conveyor belt 151 by the front end pressing roller 155 to change the transfer direction by substantially 90°.

Since the charging roller 156 charges the conveyor belt 151 at this point, the conveyor belt 151 conveys the sheet 142 while electrostatically adsorbing it. The carriage 133 moves while carrying the print head 134, and the print head 134 is driven and discharges ink droplets to the sheet 142 not in motion in response to an image signal to print an image in an amount of a single line. The print head 134 then prints the following line after the sheet 142 is conveyed in a predetermined amount. On receiving a signal indicating that the printing completes or the rear end of the sheet 142 has reached the image printing region, the printing operation finishes and the sheet 142 is ejected to the sheet ejection tray 103.

At a detection of the amount of the inkjet ink remaining in the sub-tanks 135 approaching empty, a particular amount of the inkjet ink is replenished to the sub-tank 135 from the ink cartridge 201.

A serial type (shuttle type) in which the carriage scans is used in this description but this is true in a line-type inkjet printing device having a line type head.

The terms of image forming, recording, and printing in the present disclosure represent the same meaning.

Also, recording media, media, and print substrates in the present disclosure have the same meaning unless otherwise specified.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

The present disclosure is described in detail with reference to Examples but are not limited thereto.
Preparation of Liquid Dispersion of Resin-Covered Cyan Pigment
Preparation of Polymer Solution A After a through replacement with nitrogen gas in a one litter flask equipped with a mechanical stirrer, a thermometer, a nitrogen gas introducing tube, a reflux tube, and a dripping funnel, 11.2 g of styrene, 2.8 g of acrylic acid, 12.0 g of lauryl methacrylate, 4.0 g of polyethylene glycol methacrylate, 4.0 g of styrene macromer, and 0.4 g of mercapto ethanol were admixed in the flask followed by heating to 65 degrees C.

Next, a liquid mixture of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer, 3.6 g of mercapto ethanol, 2.4 g of azobismethyl valeronitrile, and 18 g of methylethyl ketone was added dropwise to the flask in two and a half hours. Subsequently, a liquid mixture of 0.8 g of azobismethyl valeronitrile and 18 g of methylethyl ketone was added dropwise to the flask in half an hour. The resulting mixture was aged at 65 degrees for one hour. Thereafter, 0.8 g of azobismethyl valeronitrile was added followed by aging for another hour. After the reaction was complete, 364 g of methylethyl ketone was added to the flask to obtain 800 g of polymer solution A having a concentration of 50 percent by mass.
Preparation of Liquid Dispersion of Resin-Covered Cyan Pigment Next, 28 g of the polymer solution A, 42 g of phthalocyanine pigment (C.I. Pigment Blue 15:3), 13.6 g of 1 mol/L potassium hydroxide aqueous solution, 20 g of methylethyl ketone, and 13.6 g of deionized water were thoroughly stirred followed by mix-kneading with a roll mill to obtain a paste. The paste was charged in 200 g of pure water and sufficiently stirred followed by distilling away methylethyl ketone using an evaporator. The thus-obtained liquid dispersion was filtered with a polyvinylidene fluoride membrane filter having an average pore diameter of 5.0 µm under pressure to remove coarse particles. As a result, a liquid dispersion of resin-covered cyan pigment was obtained, containing a pigment portion in an amount of 15 percent by mass with a solid portion concentration of 20 percent by mass.

The volume average particle diameter D50 of the fine polymer particles in the thus-obtained liquid dispersion of resin-covered cyan pigment was 95 nm. The volume average particle diameter D50 was measured with a particle size distribution measuring instrument (NANOTRAC UPA-EX150, manufactured by NIKKISO CO., LTD.)

Manufacturing of Resin Dispersion 1

A total of 50 parts of diol, TEGOMER D3403, manufactured by Evonik Industries AG), 120 parts of polyether diol, PTMG2000, manufactured by Mitsubishi Chemical Corporation, 240 parts of polycarbonate diol, DRURANOL™ G4672, manufactured by Asahi Kasei Corporation), 35 parts of 2,2-dimethylol propionic acid, a diol with a carboxyl group at its side chain, 115 parts of 1,4-butanediol, a low molecular weight polyol, 435 parts of isophorone diisocyanate, a polyisocyanate component, and 540 parts of methylethyl ketone, an organic solvent for reaction, were allowed to conduct urethanization reaction at 80 degrees C. during stirring for 12 hours to prepare a methylethyl ketone solution of urethane prepolymer P1 having an isocyanaghe group.

Next, 25.0 parts of a neutralizing agent, triethylamine, was added to the thus-obtained urethane prepolymer P1 to obtain an even solution followed by adding 2,300 parts as an aqueous medium during stirring at 200 rpm to disperse the polyurethane prepolymer in water.

The liquid dispersion obtained was heated to 50 degrees C. during stirring for four hours to allow elongation reaction with water followed by heating at 60 degrees C. under a reduced pressure to distill away methylethyl ketone. Thereafter, water was added to adjust the concentration of the solid portion to 30 percent by mass to obtain resin dispersion 1, a urethane resin liquid dispersion.

Resin dispersion 1 obtained had a glass transition temperature of 8.0 degrees C. and a melting point of 53.3 degrees C.

Manufacturing of Resin Dispersion 2

A total of 100 parts of methylethyl ketone, 345 parts of polyesterpolyol 1 (which was obtained from iPA/AA=6/4 in molar ratio and EG/MPG=1/9 in molar ratio, where iPA=isophthalic acid, AA=adipic acid, EG=ethylene glycol, and NPG=neopenyl glycol, number average molecular weight=2,000, number of average functional groups=2), and 9.92 parts by mass of 2,2-dimethylol propionic acid (DMPA) were placed in a reaction container of a 2 L reaction container equipped with a stirrer, a thermometer, a nitrogen sealing tube, and a condenser followed by evenly mixing at 60 degrees C.

Thereafter, 40.5 parts of triethylene glycol diisocyanate (TEGDI) and 0.08 parts of dioctyltin dilaurate (DOTDL) were loaded in the reaction container to allow reaction at 72 degrees C. for three hours to obtain a polyurethane solution.

To this polyurethane solution were charged 80 parts of isopropyl alcohol (IPA), 220 parts of methylethyl ketone (MEK), 3.74 parts of triethylamine (TEA), and 596 parts of water to cause phase transfer. Subsequently, MEK and IPA were removed with a rotary evaporator to obtain resin dispersion 2, a polyurethane-based urethane resin dispersion.

Resin dispersion 2 obtained was cooled down to room temperature. Then deionized water and aqueous solution of sodium hydroxide were added to adjust the solution to achieve a solid content concentration of 30 percent by mass.

Resin dispersion 2 obtained had a glass transition temperature of −4.0 degrees C. and a melting point of 45.6 degrees C.

Manufacturing of Resin Dispersion 3

In a nitrogen atmosphere, 1,500 parts of polycarbonate diol (reaction product of 1,6-hexane diol and dimethyl carbonate, number average molecular weight (Mn) of 1000), 220 parts of 2,2-dimethylol propionic acid (DMPA), and 1,347 parts of N-methyl pyrrolidone (NMP) were charged in a reaction container equipped with a stirrer, a reflux cooling tube, and a thermometer followed by heating to 60 degrees C. to dissolve DMPA.

Next, 1,615 parts of 4,4'-dicyclohexyl methane diisocyanate and 2.6 parts of catalyst, dibutyl tin laurate, were added followed by heating to 90 degrees C. to allow urethanization reaction over five hours to obtain an isocyanate terminated urethane prepolymer.

This reaction mixture was cooled down to 80 degrees C. followed by admixing 194 parts of triethyl amine. A total of 4,340 parts of the resulting mixture was extracted and charged in a liquid mixture of 5,400 parts of water and 15 parts of triethyl amine during vigorous stirring.

Thereafter, 1,500 parts of ice and 783 parts of 35 percent by mass 2-methyl-1,5-pentane diamine aqueous solution were added to conduct chain elongation reaction followed by distillation away the solvents in such a manner that the solid portion concentration was 30 percent by mass to obtain resin dispersion 3, a polycarbonate polyurethane resin dispersion.

Resin dispersion 3 obtained had a glass transition temperature of 50.0 degrees C. and a melting point of 57.6 degrees C.

Manufacturing of Resin Dispersion 4

Synthesis of Polyester Polyol

A total of 177 g of propylene glycol, 129 g of dimethyl terephthalic acid, and 174 g of dimethyl adipate were charged in a 0.5 L separable flask while introducing nitrogen, followed by melting at 130 degrees C. After melting, 0.14 g of titanium tetraisopropoxide was added, followed by heating to 230 degrees C. in 3 to 4 hours during stirring and then allowing a reaction at 230 degrees C. for 2 to 3 hours. Thereafter, 0.07 g of titanium tetraisopropoxide was added to the reaction product, retaining it for two hours. Then nitrogen introduction was stopped and the resulting substance allowed a reaction under a reduced pressure of 15 kPa for two hours, thus obtaining polyester polyol.

In nitrogen atmosphere, 100 g of the polyester polyol obtained, 6.2 g of 2,2-bis(hydroxymethyl)propionic acid, 3.3 g of triethylamine, and 81 g of acetone were placed in a 0.5 L separable flask equipped with a stirrer, thermometer, and reflux tube followed by heating to 40 degrees C. to melt these materials. Next, 41 g of isophorone diisocyanate and a droplet of 2-ethyl tin (II) hexanoate were added followed by heating to 80 degrees C. to allow a reaction for four hours. Thereafter, the entire system was cooled down to 40 degrees C. followed by an addition of 278 g of water to obtain fine particles. Moreover, 2.3 g of diethylenetriamine was added to allow a reaction for four hours. Then acetone was purged to give resin dispersion 4, a polyester-based urethane resin dispersion having a solid portion of 31 percent by mass concentration.

Resin dispersion 4 obtained had a glass transition temperature of 19.8 degrees C. and a melting point of 58.9 degrees C.

Manufacturing of Resin Dispersion 5
Preparation of Urethane Resin Emulsion

A total of 500 g of amorphous polycarbonate diol (DURANOL™ T5651, manufactured by Asahi Kasei Chemicals Corporation) having a number average molecular weight Mn of 500, 45.8 g of dimethylol propionate, 358 g of isophorone diisocyanate (IPDI), 29.4 g of triethylamine, and 650 g of acetone were placed in an autoclave reactor equipped with a stirrer and a jacket while introducing nitrogen. Thereafter, the system was heated to 80 degrees C. to allow a urethanization reaction in 5 hours to manufacture a prepolymer.

The system was cooled down to and maintained at 40 degrees C. The percent of NCO present in the system was confirmed followed by heating and stirring for 30 minutes while slowly adding water. Thereafter, an elongation agent (isophoronediamine (IPDA)) was added followed by heating and stirring for three to six hours. Removing the organic solvent then gave resin dispersion 5, a polycarbonate urethane resin dispersion having a solid portion of 31 percent by mass concentration.

Resin dispersion 5 obtained had a glass transition temperature of −22.0 degrees C. and a melting point of 41.6 degrees C.

Method of Measuring Transfer Temperature and Melting Point of Resin Dispersion

The glass transition temperature and melting point of resin dispersions 1 to 5 were measured in the following manner.

A total of 5 g of the resin dispersion was uniformly placed in a petri dish made of tetrafluoroethylene perfluoro alkyl vinylether (PFA) copolymer followed by drying it at 50 degrees C. under a reduced pressure for one week to obtain the dried matter of the resin dispersion.

The dried resin dispersion was analyzed using a differential scanning calorimeter (DSC) (Q2000, manufactured by TA Instruments) to determine its thermal properties under the following conditions. Endothermic and exothermic energy and temperature were plotted in a graph, where the characteristic inflection was observed in the first temperature rise and determined as the glass transition temperature Tg. In addition, Tg is the value obtained by the midpoint method from the DSC curve.

The melting point is the extrapolated onset temperature obtained in the second temperature rise.

The extrapolated onset temperature is regulated according to JIS K-7121, referring to the temperature of the intersection of the straight line of the baseline on the low-temperature side extending to the high-temperature side and the tangent drawn to the curve on the low-temperature side of the melting peak at the point where the slope is maximum. Heat absorption up to the melting peak temperature starts at this onset temperature.

Measuring Conditions
  Sample container: Aluminum sample pan (with a lid)
  Quantity of sample: 5 mg
  Reference: Aluminum sample pan (empty container)
  Atmosphere: nitrogen (rate of flow: 50 ml/min)
  Onset temperature: −80 degrees C.
  Rate of first temperature rise: 10 degrees C./min
  Ending temperature: 130 degrees C.
  Retention time: one minute
  Temperature falling rate: 10 degrees C./min
  Onset temperature: −80 degrees C.
  Holding time: 5 minutes
  Rate of first temperature rise: 10 degrees C./min
  Ending temperature: 130 degrees C.

Example 1

Preparation of Ink for Inkjet Printing

The compositions and contents of the resin-covered cyan pigment liquid dispersion, resin, organic solvent, surfactant, permeating agent, defoaming agent, and preservative shown in Table 2-1 were placed in a container with a stirrer, followed by stirring for 15 minutes to obtain a uniform mixture. Then a pH regulator was added to adjust the pH to 9.0. Then pure water was added to make 100 parts by mass, followed mixing and stirring the mixture for 20 minutes. The liquid mixture obtained was filtered under an increased pressure using a polyvinylidene fluoride membrane filter with an average aperture diameter of 0.5 μm to remove coarse particles, manufacturing ink 1 for inkjet printing.

The values in Table 2 are represented in parts by weight.

Examples 2 to 14 and Comparative Examples 1 to 6

Inks 2 to 14 of Examples 2 to 14 and inks a to f of Comparative Examples 1 to 6 were manufactured in the same manner as in Example 1 except that the compositions and contents were changed as shown in Tables 2-1 to 2-3.

TABLE 2-1

|  |  | Example | | | | | | |
|---|---|---|---|---|---|---|---|---|
|  |  | 1 | 2 | 3 | 4 | 5 | 6 | 7 |
| Organic solvent | Ethanol |  | 10.00 | 5.00 | 2.50 |  |  | 10.00 |
|  | 1-methoxy-2-propanol | 17.50 |  | 7.50 |  | 10.00 |  |  |
|  | 1-ethoxy-2-propanol |  |  |  | 15.00 |  |  |  |
|  | 1-propoxy-2-propanol |  |  |  |  | 10.00 |  |  |
|  | 1-butoxy-2-propanol |  | 10.00 | 7.50 |  |  |  | 10.00 |
|  | 3-methoxy-1-butanol | 7.50 |  |  |  |  | 15.00 |  |
|  | Ethylene glycol |  | 3.00 | 3.00 | 3.00 | 3.00 | 3.00 | 3.00 |
|  | Acetone |  |  |  |  |  |  |  |
| Surfactant | Polyether-modified silicone compound |  |  |  |  |  |  |  |
|  | Polyoxyethylene alkyl ether | 0.15 | 0.20 | 0.20 | 0.20 | 0.20 | 0.20 | 0.40 |
|  | Polyether-modified siloxane compound | 0.30 | 0.40 | 0.40 | 0.40 | 0.40 | 0.40 | 0.20 |

TABLE 2-1-continued

|  |  | Example | | | | | | |
|---|---|---|---|---|---|---|---|---|
|  |  | 1 | 2 | 3 | 4 | 5 | 6 | 7 |
| Resin | Resin dispersion 1 | 5.50 | 5.50 | 5.50 | 5.50 | 5.50 | 5.50 |  |
|  | Resin dispersion 2 |  |  |  |  |  |  | 5.50 |
|  | Resin dispersion 3 |  |  |  |  |  |  |  |
|  | Resin dispersion 4 |  |  |  |  |  |  |  |
|  | Resin dispersion 5 |  |  |  |  |  |  |  |
| Coloring material | Liquid dispersion of resin-covered cyan pigment | 1.00 | 1.00 | 1.00 | 1.00 | 1.00 | 1.00 | 1.00 |
| Penetrant | EHO | 5.00 |  |  |  |  |  |  |
| Defoaming agent | Aliphatic dialcohol-based surfactant | 0.15 | 0.15 | 0.15 | 0.15 | 0.15 | 0.15 | 0.15 |
| Preservative | Benzoisothiazoline-based preservative | 0.05 | 0.05 | 0.05 | 0.05 | 0.05 | 0.05 | 0.05 |
|  | Highly pure water | 62.90 | 69.75 | 69.75 | 72.25 | 69.75 | 74.75 | 69.75 |
|  | Total | 100 | 100 | 100 | 100 | 100 | 100 | 100 |

TABLE 2-2

|  |  | Example | | | | | | |
|---|---|---|---|---|---|---|---|---|
|  |  | 8 | 9 | 10 | 11 | 12 | 13 | 14 |
| Organic solvent | Ethanol | 10.00 | 10.00 | 2.50 |  | 10.00 |  |  |
|  | 1-methoxy-2-propanol |  |  |  | 17.50 |  | 17.50 | 17.50 |
|  | 1-ethoxy-2-propanol |  |  |  |  |  |  |  |
|  | 1-propoxy-2-propanol |  |  |  |  |  |  |  |
|  | 1-butoxy-2-propanol | 10.00 | 10.00 | 15.00 |  | 10.00 |  |  |
|  | 3-methoxy-1-butanol |  |  |  | 7.50 |  | 7.50 | 7.50 |
|  | Ethylene glycol | 3.00 | 3.00 |  |  | 3.00 |  |  |
|  | Acetone |  |  |  |  |  |  |  |
| Surfactant | Polyether-modified silicone compound |  | 0.05 |  |  |  |  |  |
|  | Polyoxyethylene alkyl ether | 0.20 | 0.20 | 0.15 | 0.15 | 0.20 | 0.15 | 0.15 |
|  | Polyether-modified siloxane compound | 0.40 | 0.35 | 0.30 | 0.30 | 0.40 | 0.30 | 0.30 |
| Resin | Resin dispersion 1 |  | 5.50 | 5.50 | 3.00 | 10.00 |  |  |
|  | Resin dispersion 2 |  |  |  |  |  |  |  |
|  | Resin dispersion 3 | 5.50 |  |  |  |  |  |  |
|  | Resin dispersion 4 |  |  |  |  |  | 5.50 |  |
|  | Resin dispersion 5 |  |  |  |  |  |  | 5.50 |
| Coloring material | Liquid dispersion of resin-covered cyan pigment | 1.00 | 1.00 | 1.00 | 1.00 | 1.00 | 1.00 | 1.00 |
| Penetrant | EHO |  |  | 5.00 | 5.00 |  | 5.00 | 5.00 |
| Defoaming agent | Aliphatic dialcohol-based surfactant | 0.15 | 0.15 | 0.15 | 0.15 | 0.15 | 0.15 | 0.15 |
| Preservative | Benzoisothiazoline-based preservative | 0.05 | 0.05 | 0.05 | 0.05 | 0.05 | 0.05 | 0.05 |
|  | Highly pure water | 69.75 | 69.75 | 70.40 | 65.40 | 65.25 | 62.90 | 62.90 |
|  | Total | 100 | 100 | 100 | 100 | 100 | 100 | 100 |

TABLE 2-3

|  |  | Comparative Example | | | | | |
|---|---|---|---|---|---|---|---|
|  |  | 1 | 2 | 3 | 4 | 5 | 6 |
| Organic solvent | Ethanol | 5.00 | 5.00 | 20.00 | 5.00 |  |  |
|  | 1-methoxy-2-propanol |  |  |  | 15.00 | 20.00 | 80.00 |
|  | 1-ethoxy-2-propanol |  |  |  |  |  |  |
|  | 1-propoxy-2-propanol |  |  |  |  |  |  |
|  | 1-butoxy-2-propanol | 10.00 | 10.00 |  |  |  |  |
|  | 3-methoxy-1-butanol |  |  |  |  |  | 13.50 |
|  | Ethylene glycol | 3.00 | 3.00 | 3.00 | 3.00 | 3.00 |  |
|  | Acetone |  |  |  |  |  |  |

TABLE 2-3-continued

|  |  | Comparative Example | | | | | |
|---|---|---|---|---|---|---|---|
|  |  | 1 | 2 | 3 | 4 | 5 | 6 |
| Surfactant | Polyether-modified silicone compound | 0.08 | 0.10 |  | 1.50 |  |  |
|  | Polyoxyethylene alkyl ether | 0.20 | 0.20 | 0.30 | 0.20 | 1.00 |  |
|  | Polyether-modified siloxane compound | 0.33 | 0.30 | 0.20 | 0.40 | 0.50 |  |
| Resin | Resin dispersion 1 | 5.50 | 5.50 | 5.50 | 5.50 | 5.50 | 5.50 |
|  | Resin dispersion 2 |  |  |  |  |  |  |
|  | Resin dispersion 3 |  |  |  |  |  |  |
|  | Resin dispersion 4 |  |  |  |  |  |  |
|  | Resin dispersion 5 |  |  |  |  |  |  |
| Coloring material | Liquid dispersion of resin-covered cyan pigment | 1.00 | 1.00 | 1.00 | 1.00 | 1.00 | 1.00 |
| Penetrant | EHO |  |  | 10.00 |  |  |  |
| Defoaming agent | Aliphatic dialcohol-based surfactant | 0.15 | 0.15 | 0.15 | 0.15 | 0.15 |  |
| Preservative | Benzoisothiazoline-based preservative | 0.05 | 0.05 | 0.05 | 0.05 | 0.05 |  |
|  | Highly pure water | 74.75 | 74.75 | 59.85 | 68.25 | 68.85 |  |
|  | Total | 100 | 100 | 100 | 100 | 100 | 100 |

The details of each component shown in Tabes 2-1 to 2-3 are as follows.
Surfactant
  Polyether-modified silicone compound: SILFACE SAG503A, HLB value of 11, available from Nissin Chemical Co., Ltd.
  Polyoxyethylene alkyl ether: TRITON™ HW-1000, HLB value of 10, available from The Dow Chemical Company
  Polyether-modified siloxane compound: TEGO WET 270, HLB value of 8.6, available from Evonik Industries AG
Penetrant
  EHO: 3-ethyl-3-hydroxymethyl oxetane, available from UBE Corporation
Defoaming Agent
  Aliphatic dialcohol-based surfactant: Surfynol AD01, available from Nisshin Chemical co., ltd.)
Preservative
  Benzisothiazolone-based preservative: Proxcel LV, available from Arch Chemical, Inc.

For inks 1 to 14 of Examples 1 to 14 and Inks a to f of Comparative Examples 1 to 6, the parameters of surface free energy of an ink layer, the polar component $\gamma_s^p$ and dispersive component $\gamma_s^d$, were calculated to obtain the sum $\gamma_s$ of $\gamma_s^p$ and $\gamma_s^d$ and the ratio of $\gamma_s^p$ to $\gamma_s$. The results are shown in Table 3-1.

Each ink's discharge stability, water-resistance, and blocking resistance were evaluated. The appearance in each evaluation was observed. The results are shown in Table 3-2.
Measuring of Parameter of Surface Free Energy of Ink Layer
Preparation of Ink Layer A solid image was formed with each ink controlled to be applied at 1.0 g/m² on the entire surface of an aluminum plate (available from "IIDA KINSHO") at 23±0.5 degrees C. and 50±5 percent RH using Auto Body Printer (available from Ricoh Digital Painting Company, Ltd.). The ink applied was dried at 50 degrees for 30 seconds with the heated-wind drier mounted onto the head module to obtain an ink layer. Thereafter, the plate was cut into a 10 cm×10 cm to make a sample for measuring the surface free energy of an ink layer.

Measuring Parameter of Surface Free Energy of Ink Layer

Highly pure water was added dropwise to the ink layer obtained to measure the contact angle. Based on this contact angle, the work of adhesion Wa was calculated according to Young-Dupre equation represented by the following Relationship 3. The instrument used to measure the contact angle was Dmo-501, available from Kyowa Interface Science Co., LTD. The contact angle was defined as the value measured at 1,000 ms after the water droplet reached the ink layer. This measuring was repeated five times. The average of the five measurements was adopted.

$$Wa = \gamma_L(1+\cos\theta) \tag{3}$$

The static surface tension $\gamma_L$ of pure water was measured with a surface tensiometer DY-300 (manufactured by Kyowa Interface Science, Inc.) at 25 degrees C.

The surface tension $\gamma_S$ of a solid ink layer was indirectly measured by the two-liquid method according to Fowkes-Owens model.

Specifically, the contact angle of pure water and diiodemethane, two types of probe liquids whose polar and dispersive components are known, was measured. The dispersive component $\gamma_S^d$ of the surface free energy of an ink layer was obtained from the intercept according to the following relationship 8 and the polar component $\gamma_S^p$ of surface free energy of the ink layer was obtained from its slope.

From the polar component $\gamma_s^p$ and dispersive component $\gamma_s^d$, the sum $\gamma_s$ of $\gamma_s^p$ and $\gamma_s^d$ and the ratio of $\gamma_s^p$ to $\gamma_s$ were obtained.

$$\frac{Wa}{2\sqrt{\gamma_L^d}} = \sqrt{\gamma_s^d} + \sqrt{\gamma_s^p}\sqrt{\frac{\gamma_L^p}{\gamma_L^d}} \tag{8}$$

Discharging Stability of Ink

A solid image chart was printed on MyPaper, available from NBS Ricoh, using an inkjet printer (IPSiO Gxe5500, available from Ricoh Co., Ltd.) while changing the drive voltage of the piezoelectric elements to discharge ink evenly. The chart was created using Microsoft Word 2016, occupying 5 percent of the A4 size paper per color. Disturbing discharging was not confirmed. Thereafter, with the maintenance cap of the printer away from the nozzle to open the nozzle, the printed image was left to rest at 40 degrees C. and 10 percent RH for three hours. The same chart was printed again to evaluate the disturbing discharging of each nozzle in printing according to the following criteria. The printing mode was modified from "Plain Paper-Standard Fast" to "No Color Calibration" at a user setting for plain paper with a driver installed onto the printer.

Discharging stability was graded according to the following criteria to evaluate the ink discharging stability. The grade B and above are usable for practical purpose.

Evaluation Criteria
  A: Discharged from all nozzles
  B: Less than 10 nozzles not dischargeable
  C: 10+ nozzles not dischargeable Storage Stability of Ink An ink cartridge was filled with each ink and stored at 60 degrees C. for three weeks. The degree of thickening and agglomeration was visually observed to evaluate the storage stability of the ink according to the following criteria. The grade A and above are usable for practical purpose.

Evaluation Criteria
  S: No thickening or aggregation occurred to ink
  A: Ink slightly agglomerated
  B: Ink clearly thickened and agglomerated
  C: Ink significantly thickened and agglomerated Water-Resistance of Ink Layer A new sample of an ink layer on which a solid image of cyan ink was formed on an aluminum plate was obtained by the same method as in the sample for measuring the surface free energy of an ink layer mentioned above. The new sample was dipped in water at 25 degrees C. for one minute. The variance of the image density between before and after dipping was measured with a reflection color spectrodensitometer, available from X-Rite Inc., to obtain the water resistance (rate of fading) according to the following relationship. The water resistance of the ink layer was evaluated according to the following evaluation criteria. The grade B and above are usable for practical purpose.

Rate of fading(percent)=[1−(image density after processing)/(image density before processing)]×100

Evaluation Criteria
  A: Rate of fading was less than 10 percent
  B: Rate of fading was from 10 to less than 30 percent
  C: Rate of fading was 30 or more percent Abrasion Resistance of Ink Layer Another new sample of an ink layer on which a solid image of cyan ink was formed on an aluminum plate was obtained by the same method as in the sample for measuring the surface free energy of an ink layer mentioned above. This new sample was placed in an automatic friction abrasion analyzer (TSf-303, available from Kyowa Interface Science Co., LTD.). The surface of the sample was abraded with a water-soaked wrapping film. The difference in the concentration between before and after the test was defined as $\Delta OD$. The load applied was 80 g and the wrapping film used was 3M™ wrapping film sheet abrasive grain (granularity of aluminium oxide: 9 μm, available from 3M Company). The abrasion resistance of the ink layer was evaluated according to the following evaluation criteria. The grade B and above are usable for practical purpose.

Evaluation Criteria
  A: $\Delta OD$ was less than 0.5
  B: $\Delta OD$ was 0.5 to less than 0.8
  C: $\Delta OD$ was 0.8 or greater, or ink layer peeled off or cracked Blocking Resistance of Ink Layer Referring to TAPPI T477 testing method issued by Japan Technical Association of the Pulp and Paper Industry (TAPPI), an aluminum plate on which a 3 cm×3 cm square solid image portion formed was piled on the same aluminum plate on which ink was not applied. The plates were left to rest at 23 degrees C. and 50 percent RH for 24 hours under a load of 1 kg/m² followed by peeling off from each other. Easiness of detaching the aluminum plates from each other and the state of adherence and cohesiveness after detachment were visually observed to evaluate the blocking resistance of an ink layer according to the following evaluation criteria. The grade 4 and above are usable for practical purpose.

Evaluation Criteria
  Grade 5: Aluminum plates not stick or attach to each other
  Grade 4: Aluminum plates slightly stick to each other
  Grade 3: Aluminum plates partially stick to each other, but were separable
  Grade 2: Aluminum plates completely stick firmly to each other. Ink layer would peel off if forced to be separated Appearance of Ink Layer The appearance of the ink layer after each evaluation was visually observed.

TABLE 3-1

| | Parameter of surface free energy of ink layer | | | |
| --- | --- | --- | --- | --- |
| | Polar component $\gamma_s^p$ (mJ/m²) | dispersive component $\gamma_s^d$ (mJ/m²) | $\gamma_s$ (mJ/m²) | $\gamma_s^p/\gamma_s$ (percent) |
| Example 1 | 3.99 | 33.49 | 37.47 | 10.64 |
| Example 2 | 5.99 | 25.27 | 31.26 | 19.17 |
| Example 3 | 8.18 | 27.40 | 35.58 | 22.99 |
| Example 4 | 9.36 | 30.73 | 40.09 | 23.34 |
| Example 5 | 9.61 | 25.24 | 34.85 | 27.57 |
| Example 6 | 8.93 | 27.02 | 35.96 | 24.84 |
| Example 7 | 9.01 | 26.76 | 35.77 | 25.18 |
| Example 8 | 9.56 | 22.73 | 32.29 | 29.60 |
| Example 9 | 11.97 | 25.24 | 37.21 | 32.18 |
| Example 10 | 18.96 | 24.52 | 43.48 | 43.61 |
| Example 11 | 3.76 | 20.59 | 24.35 | 15.44 |
| Example 12 | 4.08 | 32.01 | 36.09 | 11.31 |
| Example 13 | 3.92 | 29.58 | 33.50 | 11.70 |
| Example 14 | 3.89 | 28.62 | 32.51 | 11.97 |
| Comparative Example 1 | 26.06 | 28.12 | 54.18 | 48.10 |
| Comparative Example 2 | 25.85 | 24.30 | 50.15 | 51.55 |
| Comparative Example 3 | 31.75 | 26.50 | 58.25 | 54.51 |
| Comparative Example 4 | 37.21 | 27.63 | 64.84 | 57.38 |
| Comparative Example 5 | 33.21 | 25.63 | 58.84 | 56.44 |
| Comparative Example 6 | 3.37 | 25.77 | 29.14 | 11.56 |

TABLE 3-2

| | Ink | | Ink film (applied film) | | | | |
|---|---|---|---|---|---|---|---|
| | Discharging stability | Storage stability | Water-resistance | Abrasion resistance ΔOD | Evaluation | Blocking resistance | Appearance |
| Example 1 | A | S | A | 0.434 | A | 5 | Good |
| Example 2 | A | S | A | 0.385 | A | 5 | Good |
| Example 3 | A | S | A | 0.460 | A | 5 | Good |
| Example 4 | A | A | A | 0.516 | B | 5 | Slight scratch recognized |
| Example 5 | A | S | A | 0.555 | B | 5 | Slight scratch recognized |
| Example 6 | A | S | A | 0.549 | B | 5 | Slight scratch recognized |
| Example 7 | A | S | A | 0.408 | A | 5 | Good |
| Example 8 | A | S | A | 0.476 | A | 4 | Good |
| Example 9 | A | S | B | 0.618 | B | 4 | Slightly increased concentration |
| Example 10 | A | S | B | 0.725 | B | 4 | Slightly increased concentration |
| Example 11 | A | S | A | 0.578 | B | 5 | Slight scratch recognized |
| Example 12 | B | A | A | 0.315 | A | 5 | Good |
| Example 13 | A | A | A | 0.468 | A | 4 | Good |
| Example 14 | B | A | A | 0.339 | A | 5 | Good |
| Comparative Example 1 | A | C | C | 0.965 | C | 3 | Applied film peeled, concentration decreased, adherence of aluminum plates marked on applied film |
| Comparative Example 2 | B | B | B | 0.836 | C | 3 | Adherence of aluminum plates marked on applied film |
| Comparative Example 3 | C | C | C | 1.190 | C | 2 | Applied film peeled, concentration decreased, strong tackiness resulted in peeling of applied film at the site adhering to aluminum plates |
| Comparative Example 4 | C | C | C | 1.133 | C | 3 | Applied film peeled, concentration decreased, |
| Comparative Example 5 | B | C | C | 0.986 | C | 4 | Applied film peeled, concentration decreased, |
| Comparative Example 6 | C | C | A | — | C | 4 | Cracking led to peeling off applied film |

Figure 6:
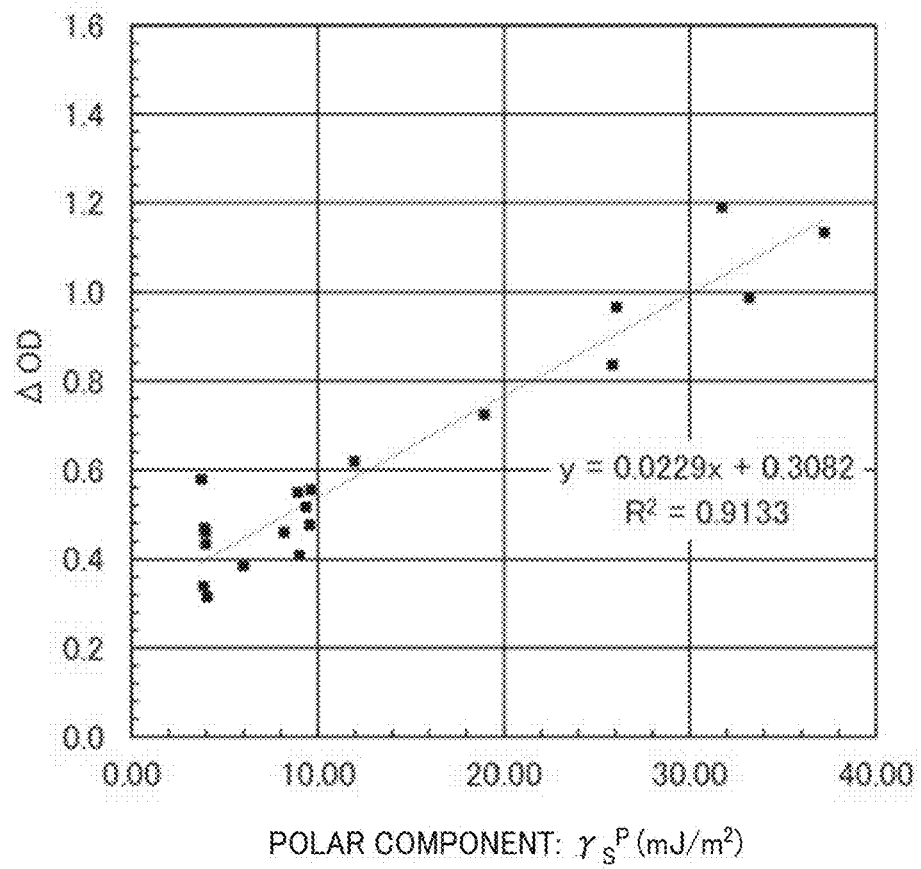
FIG. 6 is a graph illustrating the relationship between the values of the polar component $\gamma_s^p$ and the ΔOD values of abrasion resistance of an ink layer in Examples 1 to 14 and Comparative Examples 1 to 5 described later.

As seen in the results shown in Tables 3-1 and 3-2, the polar component $\gamma_s^p$ of Examples 1 to 14 and Comparative Examples 1 to 5 and ΔOD values of abrasion resistance of ink layer were plotted in a graph to review the relationship between both using FIG. 6. The obtained correlation coefficient was 0.913, indicating that there was correlation between the polar component $\gamma_s^P$ constituting the surface free energy of an ink layer and water resistance.

The water resistance of an ink layer was found to improve by adjusting the ratio of the polar component $\gamma_s^P$ to the surface free energy $\gamma_s$ of the ink layer to 10 to 50 percent, preferably 10 to 40 percent.

It was also found that an organic solvent represented by the Chemical Formula 1 illustrated above provided an aqueous ink composition with a high storage stability and discharging stability.

Moreover, a resin dispersion with a glass transition temperature of from −20 to 20 degrees C. was found to give less sticky printed matter free from cracking.

Aspects of the present disclosure are, for example, as follows:

1. An ink contains water, a coloring material, a resin, and an organic solvent, wherein a dried layer of the ink has a surface free energy $\gamma_s$ having a polar component $\gamma_s^P$ of from 3.5 to J/m² at 25 degrees C.

2. The ink according to the aspect 1 mentioned above, wherein the dried layer has a ratio ($\gamma_s^P/\gamma_s$) of from 10 to 40 percent.

3. The ink according to the aspect 1 or 2, wherein the organic solvent contains an organic solvent represented by the following Chemical Formula 1.

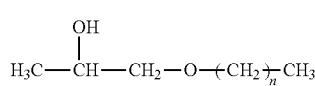

Chemical Formula 1

In Chemical Formula 1, n represents an integer of from 0 to 3.

4. The ink according to any one of the aspects 1 to 3 mentioned above, wherein the resin contains a urethane resin.

5. The ink according to any one of the aspects 1 to 4 mentioned above, wherein the resin has a glass transition temperature of from −20 to 20 degrees C.

6. The ink according to any one of the aspects 1 to 5 mentioned above, wherein the resin has a melting point of from 40 to 60 degrees C. as measured by differential scanning calorimetry.

7. The ink according to any one of the aspects 1 to 5, wherein the proportion of the resin in the ink is from 3 to 10 percent by mass.

8. An image forming apparatus includes an accommodating unit that contains the ink of any one of the aspects of 1 to 7 mentioned above and an application device that applies the ink substantially perpendicularly to the printing surface of a printing medium.

9. An image forming method includes applying the ink of any one of the aspects of 1 to 7 substantially perpendicularly to the printing surface of a printing medium.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An ink comprising:
water;
a coloring material;
a resin; and
an organic solvent,
wherein a dried layer of the ink has a surface free energy $\gamma_s$ having a polar component $\gamma_s^P$ of from 3.5 to 20 J/m² at 25 degrees C.
wherein the dried layer has a ratio of $\gamma_s^P$ to $\gamma_s$ of from 10 to 40 percent.

2. The ink according to claim 1, wherein the organic solvent comprises an organic solvent represented by the following Chemical Formula 1,

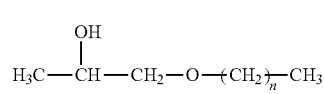

Chemical Formula 1 where n represents an integer of from 0 to 3.

3. The ink according to claim 1, wherein the resin comprises a urethane resin.

4. The ink according to claim 1, wherein the resin has a glass transition temperature of −20 to 20 degrees C.

5. The ink according to claim 1, wherein the resin has a melting point of from 40 to 60 degrees C. as measured by differential scanning calorimetry.

6. The ink according to claim 1, wherein a proportion of the resin in the ink is from 3 to 10 percent by mass.

7. An image forming apparatus comprising:
an accommodating unit to contain the ink of claim 1; and
an application device to apply the ink substantially perpendicularly to a printing surface of a printing medium.

8. An image forming method comprising:
applying the ink of claim 1 substantially perpendicularly to a printing surface of a printing medium.

* * * * *